United States Patent
Terashita

(10) Patent No.: US 6,630,975 B1
(45) Date of Patent: Oct. 7, 2003

(54) LIQUID CRYSTAL DISPLAY DEVICE, AND METHOD FOR PRODUCING THE SAME

(75) Inventor: Shinichi Terashita, Kyoto-fu (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/513,069

(22) Filed: Feb. 25, 2000

(30) Foreign Application Priority Data

Feb. 26, 1999 (JP) ............................................. 11-052033

(51) Int. Cl.$^7$ ............................................. G02F 1/1343
(52) U.S. Cl. ........................ 349/139; 349/129; 349/130
(58) Field of Search ................................. 349/143, 156, 349/129, 130, 139, 132

(56) References Cited

U.S. PATENT DOCUMENTS

| | | | | |
|---|---|---|---|---|
| 5,771,084 A | * | 6/1998 | Fujimori et al. | 349/153 |
| 6,342,938 B1 | * | 1/2002 | Song et al. | 349/143 |
| 6,384,889 B1 | * | 5/2002 | Miyachi et al. | 349/143 |

FOREIGN PATENT DOCUMENTS

| | | |
|---|---|---|
| JP | 64-42631 | 2/1989 |
| JP | 1-291215 | 11/1989 |
| JP | 3-103822 | 4/1991 |
| JP | 3-209440 | 9/1991 |
| JP | 4-139402 | 5/1992 |
| JP | 6-43461 | 2/1994 |
| JP | 6-294962 | 10/1994 |
| JP | 6-301036 | 10/1994 |
| JP | 7-64089 A | 3/1995 |
| JP | 7-120728 A | 5/1995 |
| JP | 7-311383 | 11/1995 |
| JP | 7-311383 A | 11/1995 |
| JP | 8-15714 | 1/1996 |
| JP | 8-190101 | 7/1996 |
| JP | 9-22025 | 1/1997 |
| JP | 10-90708 | 4/1998 |
| JP | 10-142591 | 5/1998 |
| JP | 10-142619 | 5/1998 |
| JP | 10-186330 A | 7/1998 |
| JP | 10-186330 | 7/1998 |
| JP | 11-149076 A | 6/1999 |

* cited by examiner

*Primary Examiner*—Robert H. Kim
*Assistant Examiner*—David Chung
(74) *Attorney, Agent, or Firm*—Nixon & Vanderhye PC

(57) ABSTRACT

A liquid crystal display device of the present invention includes a pair of electrode substrates with a liquid crystal layer being interposed therebetween. No-electrode areas, where no electrode exists, are provided in a discrete pattern partially on at least one of the pair of electrode substrates. A pixel, which is a minimum unit of display, is defined by being surrounded by a plurality of the no-electrode areas. Liquid crystal molecules are oriented in an axially symmetric orientation in each pixel when a voltage is applied between the pair of electrode substrates.

14 Claims, 9 Drawing Sheets

No-electrode area 19    Black display 21

Central axis of axially symmetric orientation 22

Pixel 23 defined by no-electrode areas

Direction of absorption axis of polarizing plate

LIQUID CRYSTAL DISPLAY DEVICE, AND METHOD FOR PRODUCING THE SAME

BACKGROUND OF THE INVENTION

1. Field of the Invention

The present invention relates to a liquid crystal display device having a wide viewing angle characteristic suitable for use in a liquid crystal display apparatus having a flat display such as a personal digital assistant, a personal computer, a word processor, an amusement apparatus, an educational apparatus, a television set, or the like, which may be viewed by a large number of people at the same time, and in a display board, a window, a door, a wall, or the like, utilizing a shutter effect.

2. Description of the Related Art

Various types of liquid crystal display devices have been used in the art, including TN (Twisted Nematic) and STN (Super Twisted Nematic) type liquid crystal display devices in which a voltage is applied through the liquid crystal layer to untwist the twisted liquid crystal molecules so as to obtain brightness/darkness, and other types of liquid crystal display devices in which a voltage is applied to change the orientation of the liquid crystal molecules from the initial orientation to another orientation so as to impart a change in birefringence to incident light, thereby obtaining brightness/darkness or color display.

However, these conventional liquid crystal display devices typically have a narrow viewing angle. Therefore, various techniques have been developed in order to increase the viewing angle.

Methods for increasing the viewing angle of a liquid crystal display device include a method in which the liquid crystal molecules are moved in a direction substantially parallel to the surface of the substrate, and a method in which each pixel is divided into a plurality of regions having different orientations with the movement of the liquid crystal molecules being perpendicular to the surface of the substrate. A typical example of the former type of method is an IPS (In-Plane-Switching) mode. As examples of the latter type of method, various liquid crystal display modes have been proposed in the art, including a wide viewing angle liquid crystal display mode in which Np (Nematic Positive) type liquid crystal molecules are horizontally oriented in axial symmetry (Japanese Laid-Open Publication No. 7-120728), another wide viewing angle liquid crystal display mode in which vertically aligned Nn (Nematic Negative) type liquid crystal molecules are horizontally oriented in axial symmetry upon application of a voltage (Japanese Laid-Open Publication No. 10-186330), another wide viewing angle liquid crystal display mode in which vertically aligned Nn (Nematic Negative) type liquid crystal molecules are oriented in a time division manner by controlling an electric field applied therethrough (Japanese Laid-Open Publication No. 7-64089), and another wide viewing angle liquid crystal display mode in which Np (Nematic Positive) type liquid crystal molecules are horizontally oriented while generally dividing each pixel into four regions (AM-LCD '96, P. 185 (1996)).

Among others listed above, Japanese Laid-Open Publication No. 7-120728 discloses a wide viewing angle liquid crystal display mode called "axially symmetric aligned microcell mode (or Np-ASM mode)", where Np type liquid crystal molecules are oriented in axial symmetry in each pixel. In a display device of this mode, each pixel is divided into a plurality of liquid crystal regions each of which is substantially surrounded by polymer walls formed by phase separation from a mixture of a liquid crystal material and a photocurable resin. The liquid crystal molecules in each pixel are oriented in axial symmetry. According to this technique, a normally white display is produced by applying a voltage through liquid crystal molecules in an axially symmetric orientation so as to orient the liquid crystal molecules perpendicular to the substrate. The technique disclosed in Japanese Laid-Open Publication No. 10-186330 employs an Nn-ASM display mode with an Nn type liquid crystal material, and produces a normally black display. The liquid crystal molecules are oriented perpendicular to the substrate in the absence of an applied voltage, and when a saturation voltage is applied, the liquid crystal molecules are oriented in the respective liquid crystal regions in a pixel each of which is substantially surrounded by polymer walls so that the liquid crystal molecules are oriented in axial symmetry for each pixel. Japanese Laid-Open Publication No. 7-311383 discloses a technique in which the liquid crystal orientation is divided into four directions by providing an orientation controlling slope using an orientation controlling layer on each substrate.

Japanese Laid-Open Publication No. 7-64089 discloses a technique in which an orientation controlling electrode is provided between pixels for applying a driving voltage which is higher or lower than that of all the other transparent electrodes. An orientation controlling window is provided in the transparent electrode in the form of a gap in the electrode. This structure allows for adjustment of the electric field through the liquid crystal layer, thereby controlling the orientation of the liquid crystal molecules. The gaps in the transparent electrode are patterned in a "x" shape on one of a pair of substrates. On the other substrate, the orientation controlling electrodes are provided in a lattice pattern. By superimposing these patterns on each other, the electric field applied through the liquid crystal layer is bent, thereby realizing a "4-division ECB" where the liquid crystal orientation is divided into four directions. However, when these patterns are used, a disclination line occurs when the voltage is turned ON/OFF, thereby affecting the voltage response characteristics and thus deteriorating the display quality. Moreover, in this conventional technique, the liquid crystal material does not contain a chiral agent, and the color shift has a substantial cell thickness dependency in a 4-division mode, thereby requiring a high precision in controlling the cell thickness. Therefore, it is very difficult to obtain a uniform display quality for a large area display device.

In the liquid crystal display device of the Np-ASM mode, which employs a normally white mode, the light-blocking portion of the BM (black matrix) needs to have a large area in order to properly prevent light leakage when the voltage is OFF. Moreover, the production of an ASM mode display device has been relatively difficult because it involves a phase separation process, which requires a precise temperature control. Furthermore, both the Np-ASM mode and the Nn-ASM mode commonly suffer from the following problems:

① The production cost is high due to the use of a photocurable resin.

② The number of production steps is increased and the production process is complicated, thereby increasing the production cost because of the step of irradiating the liquid crystal molecules with UV light with the liquid crystal molecules being orientated in axial symmetry by an application of a voltage so as to cure the photocurable resin, thereby providing an orientation stabilizing layer, and the step of patterning the polymer walls by photolithography.

Moreover, according to this method, dust is likely to attach to the substrate, thereby increasing the defect rate due to a defective liquid crystal orientation.

③ When fixing the orientation of the liquid crystal molecules, the UV light used to irradiate the liquid crystal molecules decomposes the liquid crystal material, the polymer wall material and the orientation film material, thereby lowering the voltage retention and thus lowering the reliability of the display (e.g., an image burn phenomenon may occur).

When the orientation stabilizing layer is not provided, the tilt direction of the liquid crystal molecules will not be well stabilized. Then, the response speed of the display device is reduced, whereby a stable ASM orientation may not be obtained upon driving the device, resulting in non-uniformity in displayed images.

SUMMARY OF THE INVENTION

According to one aspect of this invention, a liquid crystal display device includes a pair of electrode substrates with a liquid crystal layer being interposed therebetween. No-electrode areas, where no electrode exists, are provided in a discrete pattern partially on at least one of the pair of electrode substrates. A pixel, which is a minimum unit of display, is defined by being surrounded by a plurality of the no-electrode areas. Liquid crystal molecules are oriented in an axially symmetric orientation in each pixel when a voltage is applied between the pair of electrode substrates.

In one embodiment of the invention, each pixel includes an area in which the liquid crystal molecules are maintained in a vertical alignment in the presence of an applied voltage.

In one embodiment of the invention, a threshold voltage in voltage-transmission characteristics for the area in which the liquid crystal molecules are maintained in a vertical alignment in the presence of an applied voltage is equal to or greater than 1.5 times that for other areas, in which the liquid crystal molecules do not retain the vertical alignment in the presence of an applied voltage, and a saturation voltage in voltage-transmission characteristics for the area in which the liquid crystal molecules are maintained in a vertical alignment in the presence of an applied voltage is equal to or greater than 1.5 times that for the other areas, in which the liquid crystal molecules do not retain the vertical alignment in the presence of an applied voltage.

In one embodiment of the invention, the no-electrode areas are provided in a discrete and regular manner in each pixel. The pixel has a square shape or a rectangular shape. An axis of the axially symmetric orientation exists in the pixel.

In one embodiment of the invention, the no-electrode area has a square shape or a circular shape. Expressions 1 and 2 below are satisfied, wherein D ($\mu$m) denotes a distance between two adjacent no-electrode areas, ds ($\mu$m) denotes a length of each side or a diameter of the no-electrode area, and y=D/ds.

Expression 1: $20 \leq ds \leq 50$

Expression 2: $0.1 \leq y \leq -0.025ds + 2.25$

Each pixel defined by the no-electrode areas has a square shape or rectangular shape. If the pixel has a square shape, a size of the pixel is 20 $\mu$m×20 $\mu$m to 200 $\mu$m×200 $\mu$m. If the pixel has a rectangular shape, a length of each longer side of the pixel is 20 $\mu$m to 200 $\mu$m and an aspect ratio of the pixel (the ratio between the length and the width: "r") is 1<r<2.

In one embodiment of the invention, each no-electrode area has a rectangular shape. Expressions 3 and 4 are satisfied, wherein P ($\mu$m) denotes ½ of a distance between two adjacent no-electrode areas, ps ($\mu$m) denotes a length of the longer side of the no-electrode area, and Y=P/ps.

Expression 3: $60 \leq ps \leq 120$

Expression 4: $-10^{-6}ps^3+0.0004ps^2-0.0578ps+2.325 \leq Y \leq -10^{-6}ps^3+0.0004ps^2-0.0578ps+3.325$ Each pixel defined by the no-electrode areas has a square shape or a rectangular shape. If the pixel has a square shape, a size of the pixel is 20 $\mu$m×20 $\mu$m to 200 $\mu$m×200 $\mu$m. If the pixel has a rectangular shape, a length of each longer side of the pixel is 20 $\mu$m to 200 $\mu$m and an aspect ratio of the pixel (the ratio between the length and the width: "r") is 1<r<2.

In one embodiment of the invention, the liquid crystal layer includes a nematic liquid crystal material. the liquid crystal molecules in the nematic liquid crystal material are oriented substantially vertical to a surface of each of the pair of electrode substrates in a black display and are oriented in an axially symmetric orientation in a white display.

In one embodiment of the invention, the liquid crystal layer includes a vertical alignment layer and a nematic liquid crystal material having a negative dielectric anisotropy. The liquid crystal molecules of the nematic liquid crystal material are oriented substantially vertical to a surface of each of the pair of electrode substrates in the absence of an applied voltage.

In one embodiment of the invention, the device further includes: a liquid crystal cell including the pair of electrode substrates and the liquid crystal layer interposed between the pair of electrode substrates: a pair of polarizing plates interposing the liquid crystal cell therebetween; and a phase difference compensator provided between the liquid crystal cell and at least one of the pair of polarizing plates. Each of the polarizing plates and the phase difference compensator has three refractive indices $n_x$, $n_y$ and $n_z$ along x, y and z axis directions, respectively, which are orthogonal to one another. The refractive indices $n_x$ and $n_y$ are primary refractive indices along a plane of the liquid crystal cell, and refractive index $n_z$ is a primary refractive index along a thickness direction of the liquid crystal cell. The maximum refractive index $n_x$ axis is perpendicular to an absorption axis of one of the polarizing plate which is provided on one side of the cell closer to the viewer. The relationship $n_z<n_y<n_x$ holds between the refractive indices $n_z$, $n_y$ and $n_x$.

In one embodiment of the invention, a cell thickness keeping member for keeping a thickness of the liquid crystal layer is provided outside the pixel or in the no-electrode area.

In one embodiment of the invention, the device is applied to a plasma-addressed liquid crystal display device (PALC), a thin film transistor (TFT), or a diode.

According to another aspect of this invention, there is provided a method for producing a liquid crystal display device. The device includes a pair of electrode substrates with a liquid crystal layer being interposed therebetween. No-electrode areas, where no electrode exists, are provided in a discrete pattern partially on at least one of the pair of electrode substrates. A pixel, which is a minimum unit of display, is defined by being surrounded by a plurality of the no-electrode areas. The liquid crystal molecules are oriented in an axially symmetric orientation in each pixel when a voltage is applied between the pair of electrode substrates. The method includes the step of: (e) providing a liquid crystal material into a gap between the pair of electrode substrates.

In one embodiment of the invention, the step (e) includes the step of: (e') attaching the pair of substrates to each other and injecting the prepared precursor mixture into a gap between the pair of substrates. The method further includes the steps of: (a) heating a mixture of a liquid crystal material and a photocurable material to a temperature equal to or greater than a compatibility critical temperature of the mixture, and then cooling the mixture to prepare a precursor mixture; (b) forming electrode lines by pattern etching on one of a pair of substrates: (c) applying a vertical alignment film on each of the pair of substrates; (d) printing a seal material on one of the pair of substrates around a display area; (f) applying an external electric field to tilt liquid crystal molecules by a tilt angle, and polymerizing and curing the photocurable material with the liquid crystal molecules being tilted by the tilt angle, thereby setting an axially symmetric orientation of the liquid crystal molecules based on an orientation memory property of the liquid crystal molecules; and (g) sealing the liquid crystal layer with a sealant.

In one embodiment of the invention, the method further includes the steps of: (b) forming electrode lines by pattern etching on one of a pair of substrates; (c) applying a vertical alignment film on each of the pair of substrates; (d) printing a seal material on one of the pair of substrates around a display area; and (g) sealing the liquid crystal layer with a sealant.

Thus, the invention described herein makes possible the advantage of providing a liquid crystal display device in which the axially symmetric orientation is stabilized and a sufficient response speed can be realized without providing protrusions in a lattice-like pattern.

This and other advantages of the present invention will become apparent to those skilled in the art upon reading and understanding the following detailed description with reference to the accompanying figures.

DESCRIPTION OF THE PREFERRED EMBODIMENTS (Liquid Crystal Display Device of the Present Invention)

A liquid crystal display device of the present invention will now be described.

The term "electrode substrate" as used herein refers to a substrate having an electrode deposited thereon.

The substrate may be made of any conventional material known in the art and may be produced by any conventional method known in the art. For example, the material may be any glass or plastic material such as those commercially available from Corning Inc., Nippon Electric Glass Co. Ltd., Asahi Glass Co. Ltd., Nippon Sheet Glass Co. Ltd., and the like.

The electrode deposited on the substrate may be made of any conventional material known in the art and may be deposited on the substrate by any conventional method known in the art. The material may be ITO (indium oxide with stannic oxide (IV) added thereto), a conductive polymer, a conductive particle dispersed polymer, or the like. ITO is a preferred material. The deposition method may be, for example, a sputtering method, a vapor deposition method, an EB (electron beam) method, or the like, when the electrode material is ITO. When the electrode material is a polymer material, the deposition method may be, for example, a transfer method, a printing method, a spin coating method, or the like.

The term "liquid crystal layer" as used herein refers to a layer between a pair of electrode substrates in which a liquid crystal material is contained.

The liquid crystal material may be any conventional material known in the art that has a liquid crystal nature. Preferably, the liquid crystal material used in the present invention is a nematic liquid crystal material having a positive or negative dielectric anisotropy commercially available from Merck Japan Ltd., Chisso Corp., or the like.

In one preferred embodiment of the invention, the liquid crystal layer contains a nematic liquid crystal material having a negative dielectric anisotropy.

The term "liquid crystal cell" as used herein refers to an assembly including a pair of electrode substrates with a liquid crystal layer being interposed therebetween.

The term "no-electrode area" as used herein refers to an area on at least one substrate where the electrode is absent. The no-electrode area can be provided by any conventional method known in the art. For example, the no-electrode area may be provided by printing an electrode using a pattern such that the electrode is not printed in a portion which is to be used as the no-electrode area, or by forming the electrode over the entire area of the substrate and then removing a portion of the electrode.

Figure 2A:
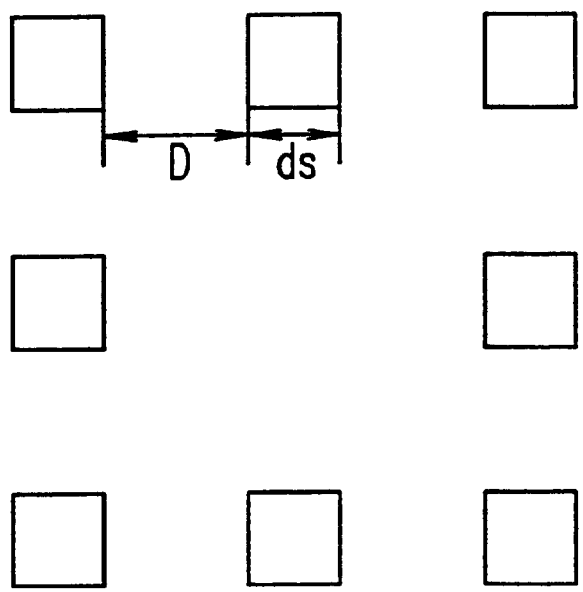
FIG. 2A is a schematic diagram illustrating a pattern of no-electrode areas (square) of a liquid crystal cell produced according to Example 1 of the present invention.
Figure 2B:
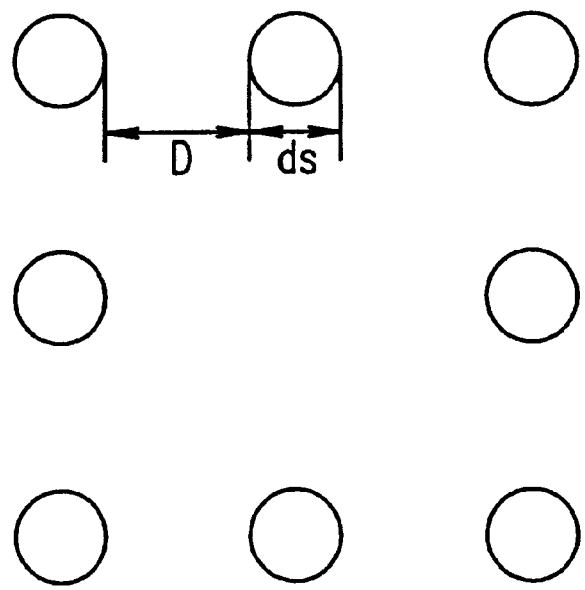
FIG. 2B is a schematic diagram illustrating a pattern of no-electrode areas (circle) of a liquid crystal cell produced according to Example 1 of the present invention.
Figure 4:
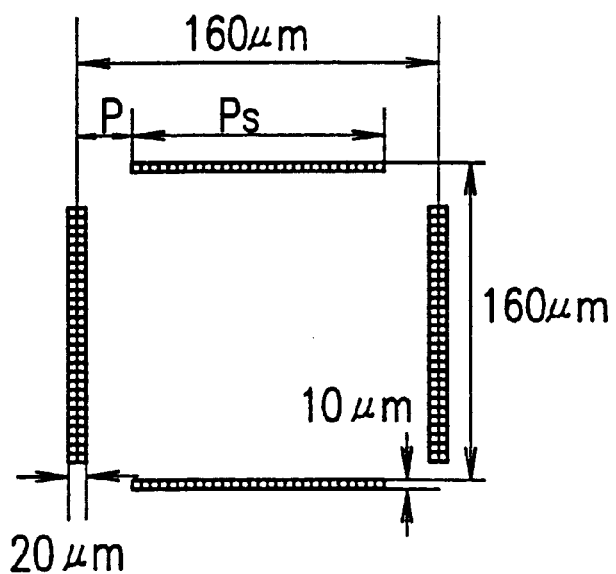
FIG. 4 a schematic diagram illustrating a pattern of no-electrode areas (broken-line pattern) of a liquid crystal cell produced according to Example 2 of the present invention.
Figure 6A:
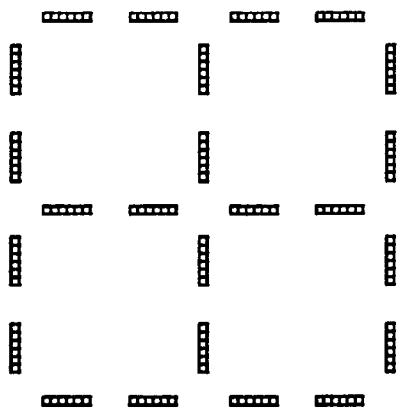
FIG. 6A illustrates an alternative shape and pattern of no-electrode areas.
Figure 6B:
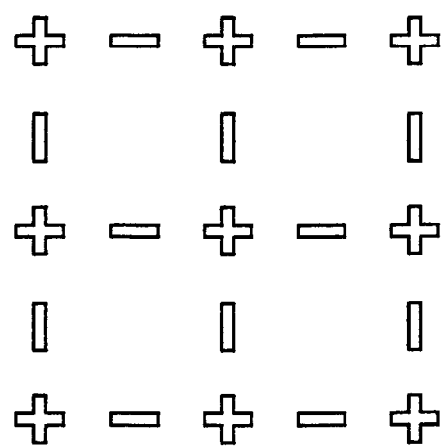
FIG. 6B illustrates an alternative shape and pattern of no-electrode areas.
Figure 6C:
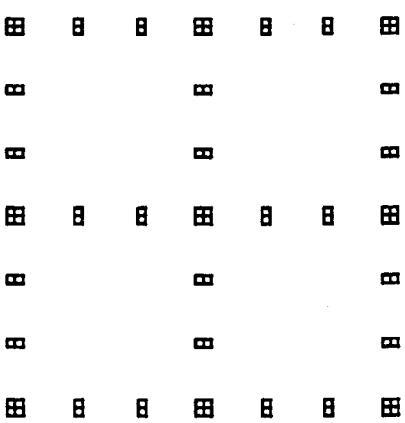
FIG. 6C illustrates an alternative shape and pattern of no-electrode areas.

The no-electrode area may be formed in any shape, e.g., a rectangular shape, a T shape, a "<" shape, or an elliptical shape. For example, the no-electrode area may have a square shape as illustrated in FIGS. 2A and 6C, a circular shape as illustrated in FIG. 2B, a rectangular shape as illustrated in FIGS. 4 and 6A, or a cross shape as illustrated in FIG. 6B. Preferably, the opposing edges of two adjacent no-electrode areas are parallel to each other.

In one preferred embodiment of the invention, the no-electrode area has a square shape or a circular shape, wherein the length of each side or the diameter thereof is preferably 20 µm to 50 µm, and more preferably 20 µm to 30 µm. Preferably, the relationship represented by Expression 2 below is satisfied, wherein D (µm) denotes the distance between two adjacent no-electrode areas, ds (µm) denotes the length of each side or the diameter of each no-electrode area, and y=D/ds.

Expression 2: $0.1 \leq y \leq -0.025ds+2.25$

More preferably, the relationship represented by Expression 2A below is satisfied.

Expression 2A: $0.1 \leq y \leq -0.025ds+2$

When such relationship is satisfied, it is possible to more stably orient the liquid crystal molecules while displaying a motion picture or a gray-scale color without irradiating a precursor mixture containing a liquid crystal material and a photocurable resin with UV light when setting the orientation of the liquid crystal material based on its orientation memory property.

In another preferred embodiment, the no-electrode area has a rectangular shape, wherein the length of the longer side of the no-electrode area is preferably 60 µm to 140 µm, and more preferably 100 µm to 120 µm. The length of the shorter side of the no-electrode area is preferably 10 µm to 50 µm, and more preferably 20 µm to 30 µm.

Preferably, the relationship represented by Expression 4 below is satisfied, wherein P (µm) denotes ½ of the distance between two adjacent no-electrode areas, ps (µm) denotes the length of the longer side of the no-electrode area, and Y=P/ps Expression 4: $-10^{-6}ps^3+0.0004ps^2-0.0578ps+2.325 \leq Y \leq -10^{-6}ps^3+0.0004ps^2-0.0578ps+3.325$ More preferably, the relationship represented by Expression 4A below is satisfied.

Expression 4A: $-10^{-6}ps^3+0.0004ps^2-0.0578ps+2.525 \leq Y \leq -10^{-6}ps^3+0.0004ps^2-0.0578ps+3.125$ Most preferably, the relationship represented by Expression 4B below is satisfied.

Expression 4B: $Y=-10^{-6}ps^3+0.0004ps^2-0.0578ps+2.825$

The term "pixel" as used herein refers to the minimum unit of display in a liquid crystal display device which is defined by being surrounded by a plurality of such no-electrode areas. For example, in the example illustrated in FIG. 2A or 2B, one pixel is defined by being surrounded by eight square or circular no-electrode areas. In the example illustrated in FIG. 4, one pixel is defined by being surrounded by four rectangular no-electrode areas.

The number of pixels may be any number as long as an axially symmetric orientation can be stably obtained in each pixel.

Even with an applied voltage, the transmission in each no-electrode area is lower than that of other black display areas and that of other "electrode areas". Therefore, in view of the voltage-transmission characteristics, the ratio of the area of the no-electrode area with respect to the area of the electrode area is preferably small. The number of axially symmetric orientations for each pixel is most preferably one.

In a multi-domain orientation, a plurality of no-electrode areas exist in one pixel, whereby the pixel is divided into sub-pixels and there are a plurality of axes of axially symmetric orientation in the pixel. In such a multi-domain orientation, the production step of attaching a pair of substrates to each other does not require a high alignment precision. However, the ratio of the total area of the no-electrode areas of each pixel with respect to the area of the electrode area of the pixel may increase. In such a case, the slope of a graph of the voltage-transmission characteristics (as that shown in FIG. 8) is likely to be lower, thereby increasing the operating voltage.

Figure 8:
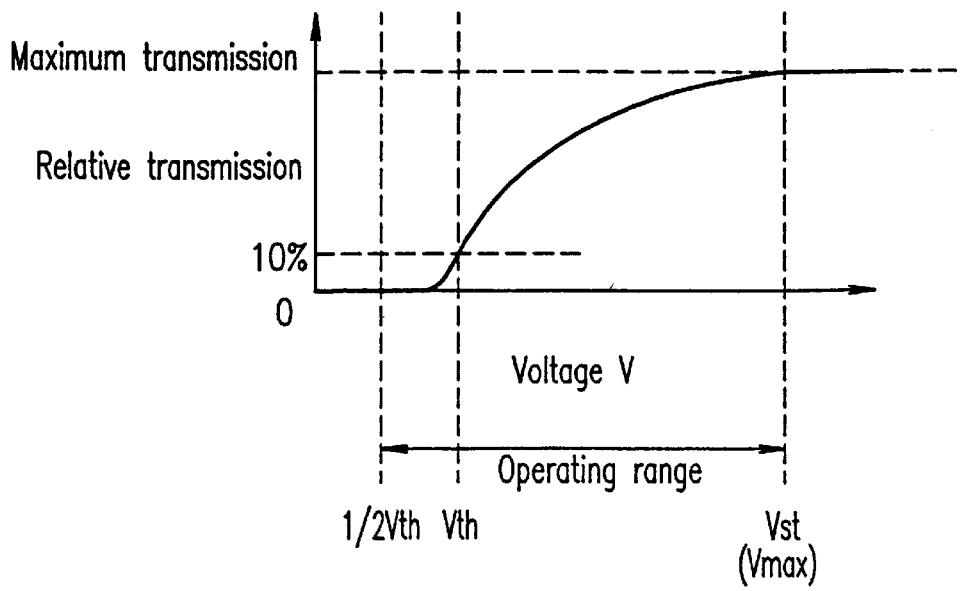
FIG. 8 is a graph illustrating voltage-transmission characteristics of the liquid crystal display device of the present invention.

The term "voltage-transmission characteristics" as used herein refer to the relationship between the applied voltage and the optical transmission, as illustrated in FIG. 8, for example.

The term "pixel region" as used herein refers to an area which corresponds to a pixel.

In one embodiment of the present invention, each pixel has a square or rectangular shape.

Where each pixel has a square shape, the size of the pixel is preferably 20 µm×20 µm to 200 µm×200 µm, more preferably 40 µm×40 µm to 150 µm×150 µm, and even more preferably 70 µm×70 µm to 100 µm×100 µm.

Where each pixel has a rectangular shape, the length of the longer side of the pixel is preferably 20 µm to 200 µm, more preferably 40 µm to 150 µm, and more preferably 70 µm to 100 µm.

When the above-described conditions are satisfied, it is possible to obtain a sufficiently short voltage response time (i.e., the sum of the values "τ rise" and "τ decay"), and thus to easily realize a stable axially symmetric orientation or a multi-domain orientation while displaying a motion picture.

When the size of the pixel is excessively large, it is difficult to obtain a desirable axially symmetric orientation and to realize the effects of the present invention. Moreover, the display is likely to have non-uniformity when viewed from an inclined angle, thereby significantly deteriorating the display quality.

Also when the size of the pixel is excessively small, the display is likely to have non-uniformity when viewed from an inclined angle, thereby significantly deteriorating the display quality.

In this embodiment, when the pixel has a rectangular shape, the aspect ratio of the pixel (the ratio between the length and the width: "r") is 1<r<2. When the aspect ratio is excessively large, the display is likely to have non-uniformity when viewed from an inclined angle, thereby significantly deteriorating the display quality.

The term "axially symmetric orientation" as used herein refers to an orientation in which the liquid crystal molecules are oriented symmetrically about a particular axis. Specific examples of the axially symmetric orientation include a radial orientation, a concentric (tangential) orientation, and the like.

An orientation in which there are a plurality of axes of symmetry in one pixel is referred to herein as a "multi-domain orientation".

For ease of discussion within this specification the term "axially symmetric orientation" will be used to also include the multi-domain orientation unless otherwise indicated.

While there is normally only one axis of symmetry in each pixel, two or more axes of symmetry may be present in one pixel which is defined by the surrounding no-electrode areas.

The no-electrode areas are arranged in a discrete pattern in each pixel. The discrete pattern may be a periodic pattern such as a dot pattern, a broken-line pattern, and a dotted-line pattern. In one embodiment of the present invention, the no-electrode areas are arranged in each pixel in a discrete and regular pattern.

The no-electrode areas are not arranged in a continuous pattern. When no-electrode areas are arranged in a continuous pattern, it will then be difficult to arrange electrode lines.

In one preferred embodiment, the threshold voltage in the voltage-transmission characteristics for the area having the vertical alignment in the presence of an applied voltage is equal to or greater than 1.5 times that for the other areas (in which the liquid crystal molecules do not retain the vertical alignment in the presence of an applied voltage), and the saturation voltage in the voltage-transmission characteristics for the area having the vertical alignment in the presence of an applied voltage is equal to or greater than 1.5 times that for the other areas (in which the liquid crystal molecules do not retain the vertical alignment in the presence of-an applied voltage).

The term "threshold voltage in the voltage-transmission characteristics" as used herein refers to a voltage with which a transmission equal to 10% of the maximum transmission of the liquid crystal display device is obtained, which can be determined with reference to the voltage-transmission characteristics curve. The threshold voltage is typically designated as "Vth" as in FIG. 8. In an embodiment where the threshold voltage in the voltage-transmission characteristics for the area having the vertical alignment in the presence of an applied voltage is high, an improved viewing angle dependency is realized.

The term "saturation voltage in the voltage-transmission characteristics" as used herein refers to the minimum voltage required to achieve the maximum transmission, which can be determined with reference to the voltage-transmission characteristics curve. The saturated voltage is typically designated as "Vst" as in FIG. 8. In an embodiment where the saturated voltage in the voltage-transmission characteristics for the area having the vertical alignment in the presence of an applied voltage is high, an improved viewing angle dependency is realized.

In one embodiment of the present invention, a pair of polarizing plates are provided with a liquid crystal cell interposed therebetween. The polarizing plate may be any conventional polarizing plate known in the art. For example, the polarizing plate may be a iodine-type polarizing plate or a dye-type polarizing plate such as those commercially available from Nitto Denko Corporation, Sumitomo Chemical Co. Ltd., Sanritz Co. Ltd., and the like.

In one embodiment of the present invention, a phase difference compensator is provided between the cell and at least one of a pair of polarizing plates. The phase difference compensator may be any conventional phase difference film known in the art. For example, a polycarbonate resin, a norbornene resin (ARTON), and a discotic liquid crystal polymer, and the like, may be used.

In one embodiment of the present invention, a cell thickness keeping member is provided outside the pixel region or in the no-electrode area.

The term "cell thickness keeping member" as used herein refers to a member inserted between a pair of electrode substrates as a spacer for keeping the cell thickness. The cell thickness keeping member may be any conventional cell thickness keeping member known in the art. For example, a plastic spacer is preferably used, such as Micro Pearl commercially available from Sekisui Fine Chemical Co. Ltd.

In one preferred embodiment of the present invention, the width of each of the electrode lines for driving the liquid crystal molecules is sufficiently larger than the pattern pitch of the no-electrode areas. The term "pattern pitch of no-electrode areas" as used herein refers to the distance between two adjacent no-electrode areas. Such an arrangement is advantageous in that the alignment of one substrate, which has no-electrode areas in each pixel, with respect to the counter substrate having driver devices provided thereon, does not require a high alignment precision in the step of attaching two substrates to each other.

In another embodiment of the present invention, the electric field applied through the liquid crystal layer is distorted or curved by using convex/concave portions arranged in a desirable pattern or by using such convex/concave portions in combination with a no-electrode area pattern, to define the orientation of the liquid crystal molecules, thereby realizing an axially symmetric orientation of a multi-domain orientation.

(Production Method of the Present Invention)

According to the second aspect, the present invention relates to a method for producing a liquid crystal display device according to the first aspect of the present invention. The method includes the step of depositing a liquid crystal material between a pair of electrode substrates.

The method for depositing a liquid crystal material between a pair of electrode substrates may be any conventional method known in the art.

In a preferred embodiment of the present invention, the method includes the steps of:

(a) heating a mixture of a liquid crystal material and a photocurable material to a temperature equal to or greater than a compatibility critical temperature of the mixture, and then cooling the mixture to prepare a precursor mixture;

(b) forming electrode lines by pattern etching on one of a pair of substrates;

(c) applying a vertical alignment film on each of the pair of substrates;

(d) printing a seal material on one of the pair of substrates around a display area;

(e') attaching the pair of substrates to each other and injecting the prepared precursor mixture into a gap between the pair of substrates:

(f) applying an external electric field to tilt the liquid crystal molecules by a tilt angle, and polymerizing and curing the photocurable material with the liquid crystal molecules being tilted by the tilt angle, thereby setting an axially symmetric orientation of the liquid crystal molecules based on an orientation memory property of the liquid crystal molecules; and (g) sealing the liquid crystal layer with a sealant.

The material and production method for producing the substrates and the electrodes may be those described above in connection with the liquid crystal display device of the present invention.

The term "liquid crystal material" as used herein refers to a liquid crystal material containing as its main component a liquid crystal molecule and optionally an additive such as a chiral dopant. The liquid crystal material may be any of those described above in connection with the liquid crystal display device of the present invention.

The term "photocurable material" as used herein refers to a material capable of producing a cured product through a polymerization reaction which is initiated by irradiation with visible light or UV light. Specifically, those obtained by adding a photodegradable initiator to a prepolymer having an ethylenic unsaturated double bond can suitably be used.

As such prepolymers, polyacrylate synthesized with a variety of polyols and epoxy resin can be preferably used. The initiator may be any conventional photoinitiator known in the art.

The term "precursor mixture" as used herein refers to a mixture of a liquid crystal material and a photocurable material.

The term "vertical alignment film" as used herein refers to a film having a function of aligning the liquid crystal molecules substantially vertical to the substrate. Any conventional material and any production method known in the art may be used for producing the vertical alignment film. The material of the vertical alignment film is preferably polyimide, or the like, and the production method is preferably a spin coating method, a roll coating method, a screen printing method, or the like.

The term "seal material" as used herein refers to a material for adhesively holding the pair of substrates together so as to prevent the liquid crystal molecules from being exposed to the external environment. Any conventional material and any production method known in the art may be used for producing the seal material. The material of the seal material is preferably an epoxy resin, a photocurable resin, or the like, and the production method is preferably a screen printing method, a dispenser printing method, or the like.

The term "sealant" as used herein refers to a material used to seal the injection port of the liquid crystal cell after the injection of the liquid crystal material so as to prevent the liquid crystal material from leaking through the injection port and being exposed to the environment. Any conventional material and any production method known in the art may be used for producing the sealant. The material of the sealant is preferably a UV curable resin, or the like, and the sealant is produced preferably by, for example, applying such a resin across the injection port and then irradiating and curing the resin with UV light.

Step (a) is a step of heating a mixture of a liquid crystal material and a photocurable material to a temperature equal to or greater than a compatibility critical temperature of the mixture, and then cooling the mixture to prepare a precursor mixture.

The term "compatibility critical temperature" as used herein refers to a temperature at which the liquid crystal material and the photocurable material become compatible with each other. While the compatibility critical temperature varies depending upon the selected materials, it is normally 80° C. to 130° C. The heating and cooling may be effected by any conventional method known in the art.

Step (b) is a step of forming electrode lines by pattern etching on one of a pair of substrates. The term "pattern etching" as used herein refers to a process of patterning the electrode line or the no-electrode area into an intended pattern. While the pattern etching may be effected by any conventional method known in the art, it is preferably effected by a photolithography method, a laser drawing method, or the like.

Step (c) is a step of applying a vertical alignment film on each of the pair of substrates. While the application of the vertical alignment film may be effected by any conventional method known in the art, it is preferably effected by a spin coating method, a screen printing method, a transfer method, or the like.

Step (d) is a step of printing a seal material on one of the pair of substrates around a display area. The printing of the seal material may be effected by any conventional method known in the art, it is preferably effected by a screen printing method, a dispenser printing method, or the like.

Step (e') is a step of attaching the pair of substrates to each other and injecting the prepared precursor mixture into a gap between the pair of substrates.

Step (f) is a step of applying an external electric field to tilt the liquid crystal molecules by a tilt angle, and polymerizing and curing the photocurable material with the liquid crystal molecules being tilted by the tilt angle, thereby setting an axially symmetric orientation of the liquid crystal molecules based on an orientation memory property of the liquid crystal molecules.

The term "tilt angle" as used herein refers to an angle of liquid crystal molecules with respect to the substrate. "Tilting liquid crystal molecules" means to incline the liquid crystal molecules from their original orientation, which is vertical to the substrate.

The term "external electric field for tilting liquid crystal molecules" as used herein refers to any external field capable of tilting the liquid crystal molecules. For example, the external field may be an applied voltage or an applied magnetic field. Preferably, a voltage is applied.

Where a voltage is used to tilt liquid crystal molecules by a tilt angle, the voltage is referred to herein as the "axially symmetric orientation central axis setting voltage".

The application of the axially symmetric orientation central axis setting voltage may be effected by using electrodes (15 and 16 in FIG. 1A) for applying a voltage through a liquid crystal layer (13 in FIG. 1A) for displaying an image.

The axially symmetric orientation central axis setting voltage is preferably equal to or greater than ½ of Vth, wherein Vth denotes a voltage value with which a transmission equal to 10% of the maximum transmission of the liquid crystal display device is obtained. The axially symmetric orientation central axis setting voltage is preferably an alternating voltage having a frequency equal to or greater than 1 Hz.

Step (g) is a step of sealing the liquid crystal layer with a sealant.

While the sealing of the liquid crystal layer may be effected by any conventional method known in the art using any sealant, it is preferably effected by irradiating with UV light an epoxy-type UV curable resin commercially available as a sealant.

When the particularly preferred liquid crystal display device described above is used, steps (a) and (f) may be omitted. In such a case, it is preferred to employ a production method including steps (b), (c), (d), (e) and (g).

(Basic Operation)

Figure 1A:
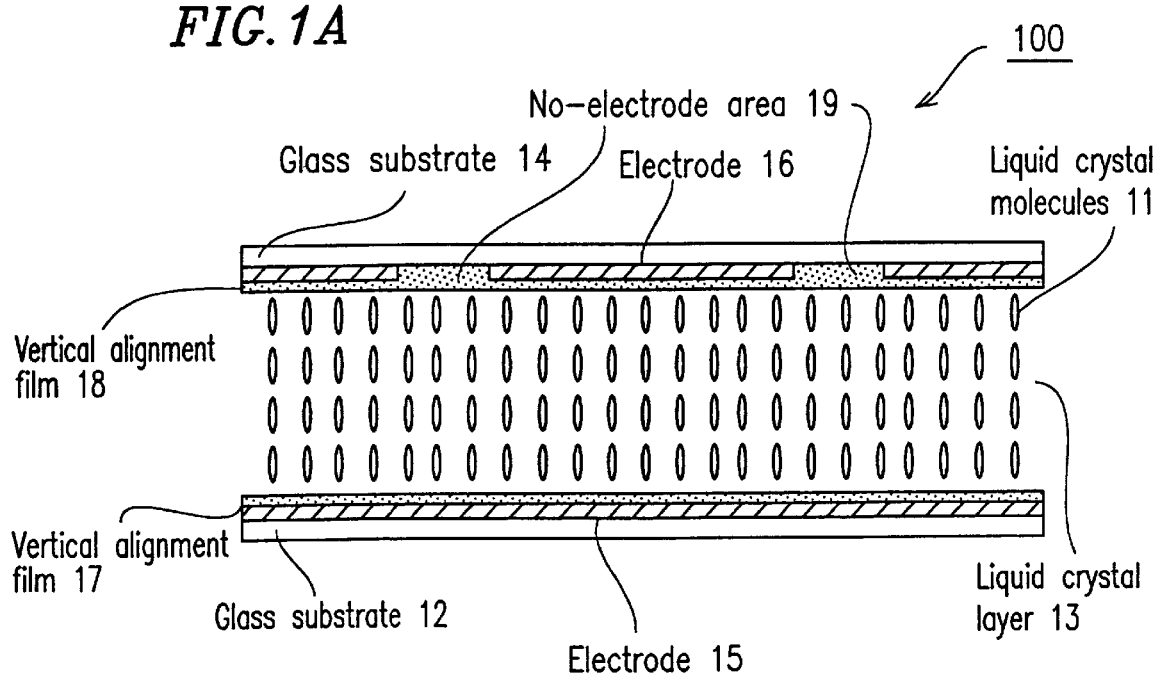
FIG. 1A is a cross-sectional view illustrating a state of a liquid crystal display device 100 of the present invention in the absence of an applied voltage.
Figure 1B:
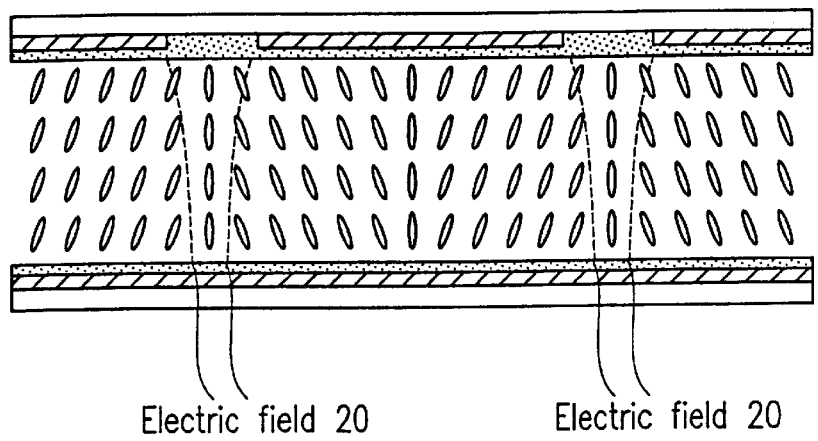
FIG. 1B is a cross-sectional view illustrating a state of the liquid crystal display device 100 of the present invention in the presence of an applied voltage.
Figure 1C:
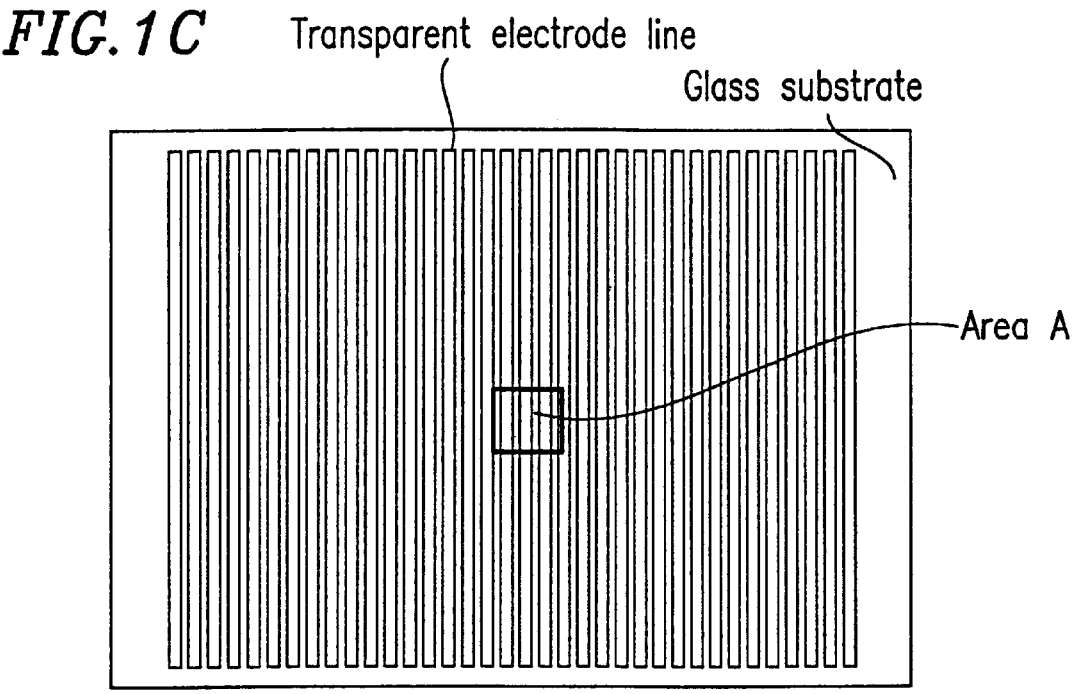
FIG. 1C illustrates an arrangement of electrode lines of the liquid crystal display device of the present invention.
Figure 1D:
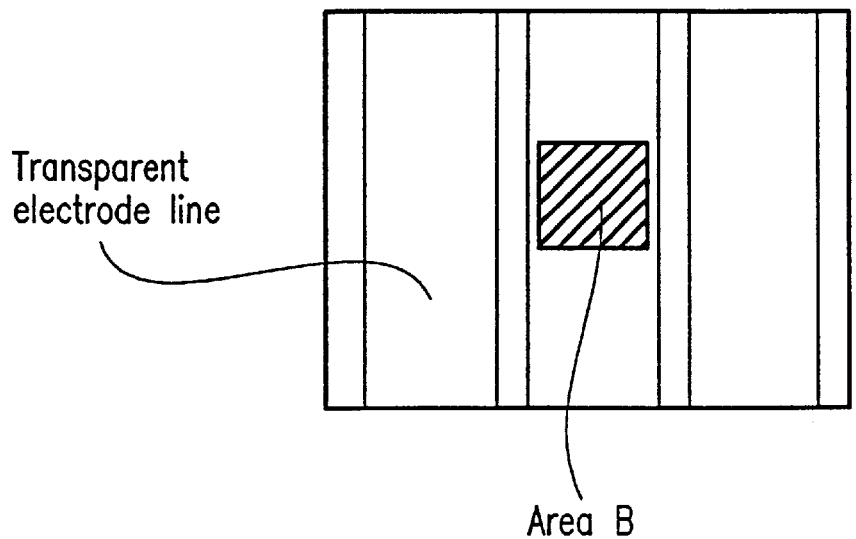
FIG. 1D is an enlarged view illustrating an area A of the liquid crystal display device of the present invention.
Figure 1E:
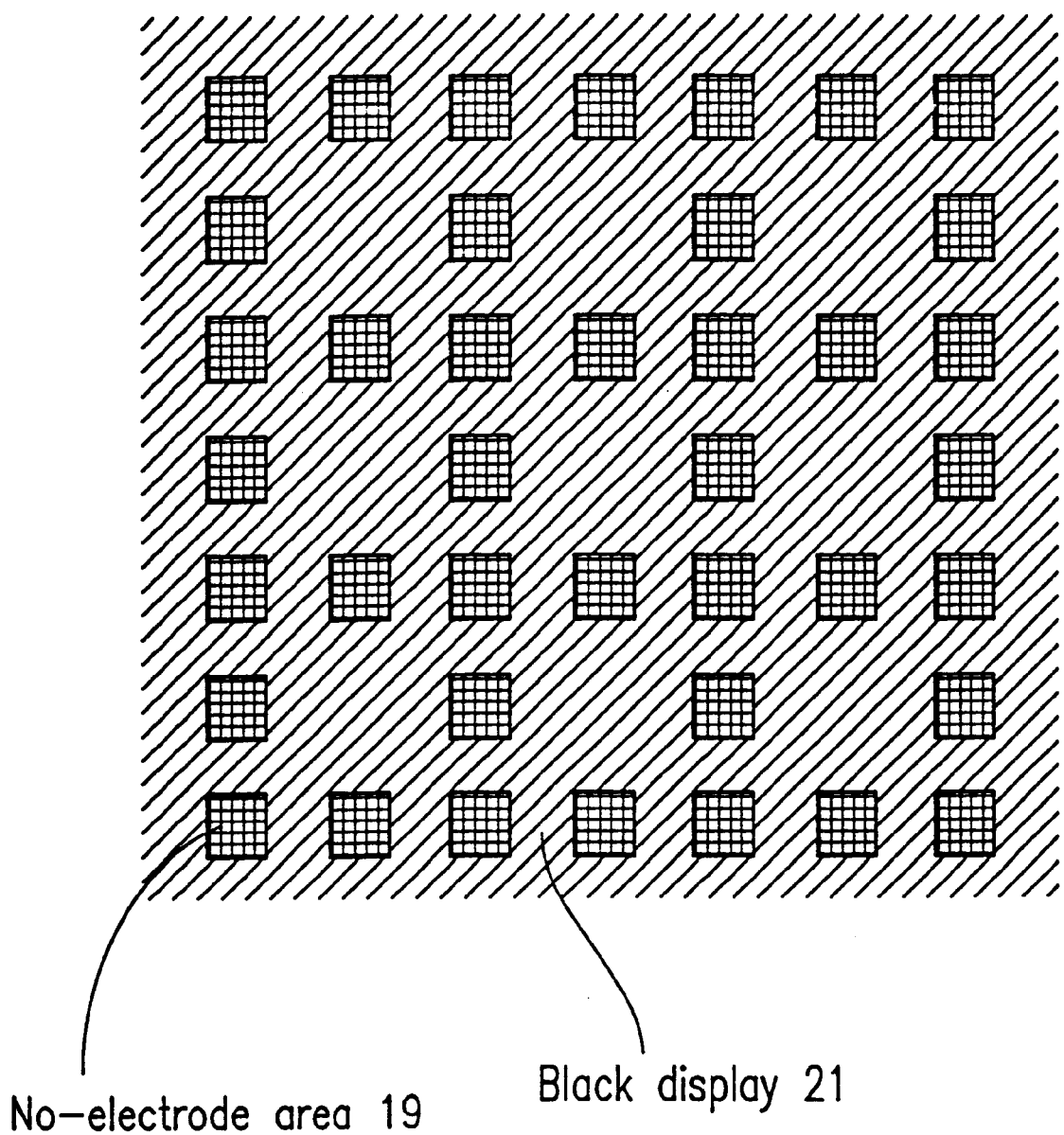
FIG. 1E illustrates a display state of the liquid crystal display device 100 of the present invention (enlarged view of area B) in the absence of an applied voltage.
Figure 1F:
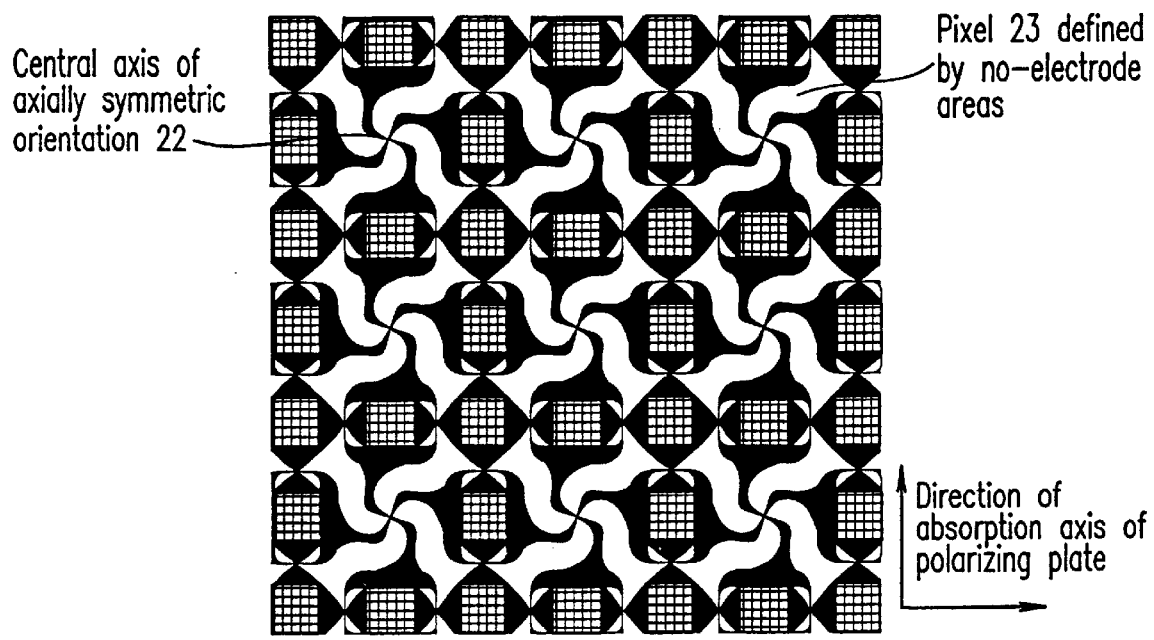
FIG. 1F illustrates a display state of the liquid crystal display device 100 of the present invention (extinction pattern (schlieren pattern)) in the presence of an applied voltage.

Referring to FIGS. 1A to 1G, the operation principle of the liquid crystal display device of the present invention will now be described. FIGS. 1A and 1E illustrate a state of the liquid crystal display device in the absence of an applied voltage, and FIGS. 1B and 1F illustrate a state of the liquid crystal display device in the presence of an applied voltage. FIGS. 1A and 1B each illustrate a cross-sectional view of the liquid crystal display device, and FIGS. 1E and 1F each illustrate how the upper surface of the liquid crystal display device is observed with a polarization microscope in a crossed Nicols state. FIGS. 1C and 1D each illustrate an area from FIGS. 1E and 1F which is enlarged.

A liquid crystal display device 100 of the present invention includes a pair of glass substrates 12 and 14 with a liquid crystal layer 13 being interposed therebetween. The liquid crystal layer 13 contains liquid crystal molecules 11 which have a negative dielectric anisotropy. Transparent electrodes 15 and 16 are provided on one surface of the pair of glass substrates 12 and 14, respectively, which faces the liquid crystal layer 13. Vertical alignment films 17 and 18 are provided on the transparent electrodes 15 and 16, respectively. In each pixel, at least one of the transparent electrodes (16 in this example) includes no-electrode areas 19 which are provided at regular intervals.

Each area exhibiting an axially symmetric orientation in the presence of an applied voltage is defined by being surrounded by the no-electrode areas 19 which are provided at regular intervals. Therefore, as illustrated in FIG. 1F, the liquid crystal molecules 11 are oriented in an axially symmetric orientation about a central axis 22 of axial symmetry in each pixel region 23 which is defined by being surrounded by the no-electrode areas 19 which are provided at regular intervals.

In the absence of an applied voltage, the liquid crystal molecules 11 are aligned vertical to the substrate, as illustrated in FIG. 1A, by an anchoring force of the vertical alignment films 17 and 18. When observed by a polarization microscope in a crossed Nicols state, the pixels in the absence of the axially symmetric orientation central axis setting voltage exhibits a dark field (normally black mode), as illustrated in FIG. 1E. When the axially symmetric orientation central axis setting voltage is applied through the liquid crystal display device, a force acts upon the liquid crystal molecules 11 with a negative dielectric anisotropy and orients the molecules 11 so that the long axis of the molecules 11 is perpendicular to the direction of the electric field. As a result, the molecules 11 incline from a direction perpendicular to the substrate, as illustrated in FIG. 1B. This state is referred to as a gray-level display state.

Figure 1G:
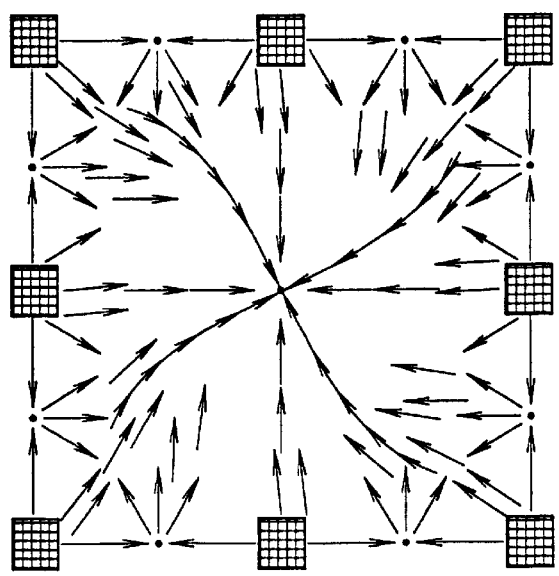
FIG. 1G illustrates a mechanism of orientation of liquid crystal molecules.

The orientation vector of the liquid crystal molecules 11 is oriented in the direction toward the center of each pixel which is defined by the no-electrode areas 19, as illustrated in FIG. 1G. Therefore, when the pixel is observed by a polarization microscope in a crossed Nicols state, an extinction pattern (schlieren pattern) is observed in a direction parallel or perpendicular to the polarization axis, as illustrated in FIG. 1F. While the no-electrode area exhibits a black display in the presence of an applied voltage, an axially symmetric orientation appears even in the no-electrode area when a sufficiently large voltage is applied, i.e., when in the presence of an applied voltage exceeding a voltage with which the voltage-transmission characteristics of the electrode area are saturated.

Thus, in the liquid crystal display device of the present invention, the optimal value of the retardation (cell thickness d×Δn) of the liquid crystal layer is slightly increased, whereby the cell thickness can be increased as compared to a case where the no-electrode area is not included in a display pixel. The value d×Δn (the product of the thickness d of the liquid crystal layer and the value of the refractive index Δn of the liquid crystal material) is preferably 300 nm to 650 nm. Outside the range, it is difficult to obtain a viewing angle compensation effect provided by a phase difference compensator to be described later, whereby the viewing angle dependency is likely to increase.

(No-electrode Areas which Define the Pixel)

The liquid crystal display device 100 of the present invention includes the no-electrode areas 19 surrounding each pixel. Where the no-electrode areas 19 are not provided, and the thickness of the liquid crystal layer 13 ("cell gap") is uniform, the position and the size of each liquid crystal domain (an area where the orientation of the liquid crystal molecules 11 vary continuously) are not defined, thereby resulting in a random orientation, and thus non-uniform display in a gray-level display.

By providing the no-electrode areas 19 which surround and define the pixels, the position and the size of each liquid crystal domain which exhibits an axially symmetric orientation are defined. The shape of each pixel defined by the no-electrode areas 19 is preferably a square or rectangular shape. When each pixel has a square shape, the size of the pixel is 20 μm×20 μm to 200 μm×200 μm. When each pixel has a rectangular shape, the length of the longer side of the pixel is preferably 20m to 200 μm, and the aspect ratio (the ratio between the length and the width: "r") is preferably 1<r<2.

Sample liquid crystal display devices were produced as follows. An ITO transparent electrode having a thickness of 100 nm was provided on the substrate 12, and JALS-204 (manufactured by Japan Synthetic Rubber Ltd.) was spin coated to provide a vertical alignment film (not shown). Another ITO transparent electrode having a thickness of 100 nm was provided on the other glass substrate 14, as illustrated in FIG. 1A. Then, the transparent electrode was partially removed by photolithography and etching so as to provide the no-electrode areas in a dotted-line pattern with the length of each side (when the no-electrode area has a rectangular shape) or the diameter (when the no-electrode area has a circular shape) of each no-electrode area being ds, and the interval between two adjacent no-electrode areas being D (y=D/ds), as illustrated in FIGS. 2A and 2B. The value of ds and the value of D (and the value of y) were varied for different sample devices produced as shown in Table 1 below. Then, JALS-204 (Japan Synthetic Rubber Ltd.) was spin coated on the transparent electrode to provide a vertical alignment film having a thickness of 80 nm.

Table 1

Length (ds) of each side of no-electrode area, interval (D) between adjacent no-electrode areas, and value of y (=D/ds)

TABLE 1

Length (ds) of each side of no-electrode area, interval (D) between adjacent no-electrode areas, and value of y (=D/ds)

| ds (μm) | 10 | 10 | 10 | 10 | 10 | 10 | 20 | 20 | 20 | 20 | 20 |
|---|---|---|---|---|---|---|---|---|---|---|---|
| D (μm) | 10 | 15 | 20 | 25 | 30 | 35 | 2 | 10 | 20 | 25 | 30 |
| y | 1 | 1.5 | 2 | 2.5 | 3 | 3.5 | 0.1 | 0.5 | 1 | 1.25 | 1.5 |
| ds (μm) | 20 | 20 | 20 | 20 | 20 | 20 | 20 | 20 | 30 | 30 | 30 |
| D (μm) | 35 | 40 | 45 | 50 | 80 | 100 | 120 | 180 | 3 | 15 | 30 |
| y | 1.75 | 2 | 2.25 | 2.5 | 4 | 5 | 6 | 9 | 0.1 | 0.5 | 1 |
| ds (μm) | 30 | 30 | 30 | 30 | 30 | 40 | 40 | 40 | 40 | 40 | 40 |
| D (μm) | 37.5 | 45 | 52.5 | 60 | 67.5 | 4 | 20 | 40 | 50 | 60 | 70 |
| y | 1.25 | 1.5 | 1.75 | 2 | 2.25 | 0.1 | 0.5 | 1 | 1.25 | 1.5 | 1.75 |

TABLE 1-continued

Length (ds) of each side of no-electrode area, interval
(D) between adjacent no-electrode areas, and value of y (=D/ds)

| ps (μm) | 40 | 50 | 50 | 50 | 50 | 50 | 60 | 80 | 100 | 120 |
|---|---|---|---|---|---|---|---|---|---|---|
| P (μm) | 80 | 5 | 25 | 62.5 | 75 | 50 | 40 | 30 | 20 | 10 |
| Y | 2 | 0.1 | 0.5 | 1.25 | 1.5 | 1 | 0.67 | 0.38 | 0.20 | 0.08 |

The substrates 12 and 14 were attached together via a seal material therebetween while controlling the cell thickness to be 6 μm with a plastic spacer, thereby producing a liquid crystal cell. In the process of dispersing the plastic spacers as a cell thickness keeping member across the surface of the electrode substrate, it is possible to apply an electric field through the electrode substrate so as to selectively place the plastic spacers in the electrode area. In such a case, the spacers will not be present within the pixel region, thereby avoiding disturbance in the orientation of the liquid crystal molecules. Moreover, it is possible to use a photocurable material so as to provide a cell thickness keeping member with an intended height at an intended location outside the pixel region.

An Nn type liquid crystal material ($\Delta\epsilon=-4.0$, $\Delta n=0.08$, with a twist angle inherent to the liquid crystal material adjusted to 90° twist with a cell gap of 6 μm) was injected into the produced liquid crystal cell, and an axially symmetric orientation central axis setting voltage of 3.5 V was applied through the cell. A pixel of the produced liquid crystal cell was observed by a polarization microscope (in a crossed Nicols state) in a transmission mode. After a continued application of the axially symmetric orientation central axis setting voltage, a substantially single axially symmetric region ("monodomain") was obtained, by the no-electrode area pattern, for each pixel 23 which is defined by the no-electrode areas, as shown in FIG. 1F. There were some no-electrode area patterns with which the liquid crystal molecules were oriented in axial symmetry. The number of pixels (defined by the no-electrode areas) out of 300 pixels in which the liquid crystal molecules were oriented in axial symmetry was measured. Each pattern with which 90% or more of the 300 pixels had an axially symmetric orientation was marked as good "○", and each pattern with which less than 90% of the 300 pixels had an axially symmetric orientation was marked as defective "x". The evaluation results are shown in FIG. 3.

Figure 3:
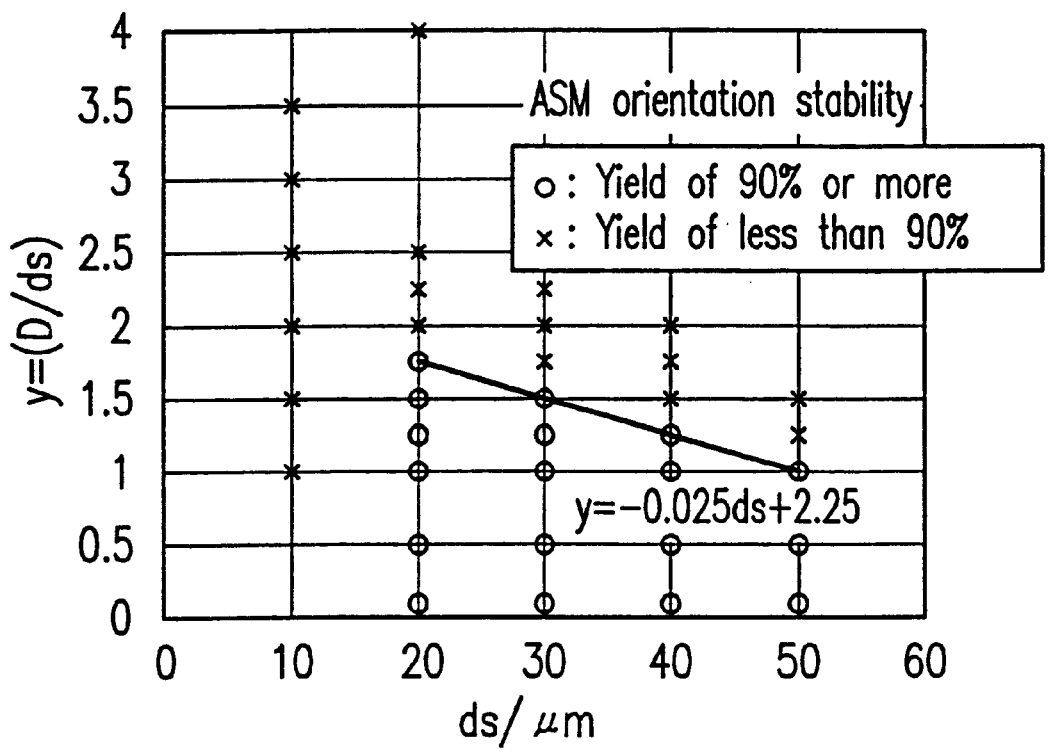
FIG. 3 is a graph illustrating the evaluation results for Example 1 (where the no-electrode areas are provided in a dot pattern)

As is evident from FIG. 3 (the vertical axis represents the value of y, and the horizontal axis represents the value of ds/μm), a liquid crystal display device is practically usable when the following relationships are both satisfied.

$20 \leq ds \leq 50$ (Expression 1)

$0.1 \leq y \leq -0.025ds+2.25$ (Expression 2)

If these relationships are not satisfied, the orientation of the liquid crystal molecules is unlikely to be a multi-domain orientation (a periodic axially symmetric orientation) and is likely to be a random orientation, as in a case where such no-electrode areas are not provided at all. It has been found that satisfying the following relationships is more preferably.

$20 \leq ds \leq 50$ (Expression 1)

$0.1 \leq y \leq -0.025ds+2$ (Expression 2A)

It has been found that within such a range, the precursor mixture and the exposure process for setting an axially symmetric orientation of the liquid crystal molecules based on the orientation memory property thereof are not necessary. Therefore, in such a case, steps (a) and (f) of the above-described production method of the present invention can be omitted.

Moreover, the size of each of the pixels defined by the no-electrode areas which are provided on at least one of the substrates is preferably less than or equal to 70 μm×70 μm in order to realize, when displaying a motion picture, a sufficiently short voltage response time (i.e., the sum of the values "τ rise" and "τ decay") and a stable axially symmetric orientation.

In a manner similar to that used for providing the dotted-line pattern, no-ITO electrode areas were provided in a broken-line pattern as illustrated in FIG. 4, by photolithography and etching, while varying the length ps of each side of each no-electrode area and the distance P which is ½ of the interval between two adjacent no-electrode areas (Y=P/ps), as shown in Table 2 below.

TABLE 2

Length (ps) of each side of no-electrode area, interval (P)
between adjacent no-electrode areas, and value of Y (=P/ps)

| ps(μm) | 60 | 80 | 100 | 120 |
|---|---|---|---|---|
| P(μm) | 40 | 30 | 20 | 10 |
| Y | 0.67 | 0.38 | 0.20 | 0.08 |

The size of each pixel defined by the no-electrode areas was 160 μm×160 μm. The results of the evaluation of the sample devices are shown in FIG. 5.

Figure 5:
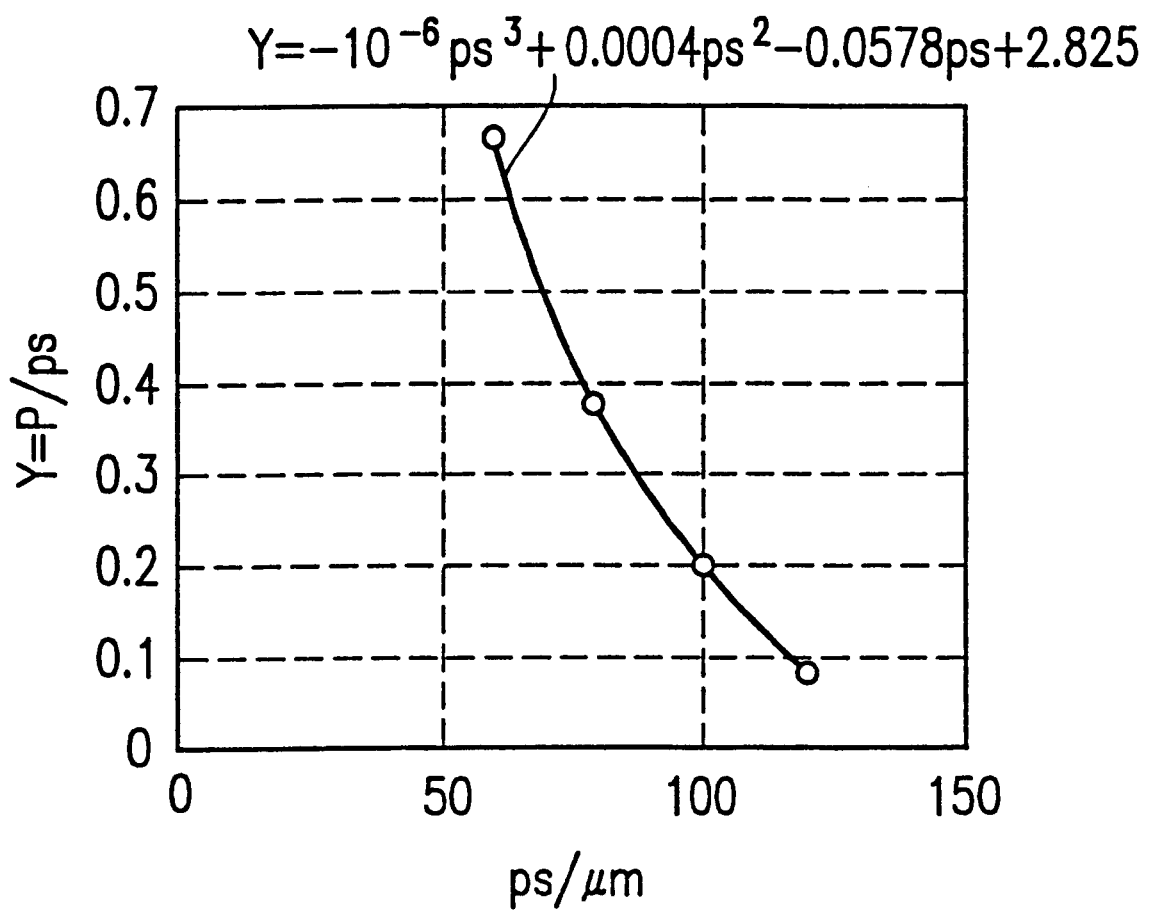
FIG. 5 is a graph illustrating the evaluation results for the orientation observed in Example 2 (where the no-electrode areas are provided in a broken-line pattern)

The results shown in FIG. 5 indicate that a stable axially symmetric orientation can be realized when the value of ps and the value of y satisfy the following relationships.

$60 \leq ps \leq 120$ $Y=-10^{-6}ps^3+0.0004ps^2-0.0578ps+2.825$ (2)

If these relationships are not satisfied, the orientation of the liquid crystal molecules is unlikely to be a multi-domain orientation (a periodic axially symmetric orientation) and is likely to be a random orientation, as in a case where such no-electrode areas are not provided at all.

The size of each of the pixels defined by the no-electrode areas is preferably less than or equal to 70 μm×70 μm. It has been found that within such a range, the precursor mixture and the exposure process for setting an axially symmetric orientation of the liquid crystal molecules based on the orientation memory property thereof are not necessary. Therefore, in such a case, steps (a) and (f) of the above-described production method of the present invention can be omitted.

When an Nn liquid crystal material with no chiral agent was injected into a liquid crystal cell produced as described above, an axially symmetric orientation was obtained about an axis substantially at the center of a pixel defined by the no-electrode areas in the presence of an applied voltage. However, when an Nn liquid crystal material with a chiral agent mixed therein was injected into the liquid crystal cell, the orientation was different from that obtained with a liquid crystal material with no chiral agent. With a chiral agent, when the polarizing plates were rotated in a crossed Nicols state, the transmission did not change with the extinction pattern (schlieren pattern) rotating. Without a chiral agent, when the polarizing plates were rotated in a crossed Nicols state, the transmission changed. Thus, it was demonstrated that the orientations were different from each other.

(Stabilization of Axially Symmetric Orientation of Liquid Crystal Molecules)

In an embodiment of the present invention, the method for producing a liquid crystal display device includes the step of previously setting an axially symmetric orientation of the liquid crystal molecules in the presence of the axially symmetric orientation central axis setting voltage based on the orientation memory property thereof. In such a case, in the presence of an applied voltage, the axially symmetric orientation of the liquid crystal molecules is obtained for each pixel with good reproducibility, and it is possible to stabilize the obtained axially symmetric orientation. A mixture of 99.6 wt % of an Nn liquid crystal material having a negative dielectric anisotropy ($\Delta\varepsilon$=-4.0, $\Delta$n=0.08, with a twist angle adjusted to 90° twist with a cell gap of 6 $\mu$m) and 0.4 wt % of a photocurable material was injected into a produced liquid crystal cell. As the photocurable material, a mixture of compound A (95 wt %) as a photocurable resin represented by Formula 1 below and a photoinitiator Irgacur651 (5 wt %) was used.

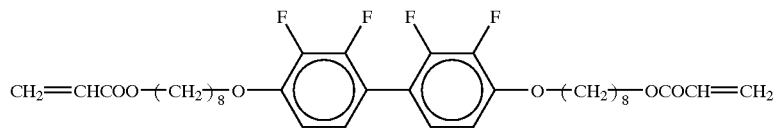

It is possible to provide an orientation setting layer and to produce a liquid crystal display device as described above through the steps of: injecting a precursor mixture of a liquid crystal material and a photocurable material into a gap between a pair of substrates; heating the precursor mixture to a temperature equal to or greater than the compatibility critical temperature of the precursor mixture; and exposing the precursor mixture to light with an axially symmetric orientation central axis setting voltage being applied therethrough. The orientation setting layer has a polymer stabilizing function, i.e., a function of defining a tilt direction of the liquid crystal molecules with respect to the substrate by the polymer network formed as the photocurable resin material is cured.

In order to stabilize the axially symmetric orientation of the liquid crystal molecules in the presence of an applied voltage, it is important to ensure that the liquid crystal molecules are tilted by a certain angle (tilt angle) with respect to the substrate surface during the step of setting an axially symmetric orientation of the liquid crystal molecules based on the orientation memory property thereof. This can be ensured (and thus the axially symmetric orientation of the liquid crystal molecules can be stabilized) by using an axially symmetric orientation central axis setting voltage which is higher than the threshold axially symmetric orientation central axis setting voltage ("Vth" in FIG. 8, at which the liquid crystal molecules start tilting with respect to the surface of the substrate) and lower than the saturation axially symmetric orientation central axis setting voltage ("Vst" in FIG. 8, at which the liquid crystal molecules are tilted substantially parallel to the surface of the substrate). The application of such an axially symmetric orientation central axis setting voltage may be effected by using the electrodes (15 and 16 in FIG. 1A) for applying the axially symmetric orientation central axis setting voltage through the liquid crystal layer (13 in FIG. 1A) for displaying an image. The axially symmetric orientation central axis setting voltage is preferably an alternating voltage which is equal to or greater than ½ of Vth and has a frequency equal to or greater than 1 Hz.

The axially symmetric orientation may also be stabilized by providing a plurality of axially symmetric orientations for one pixel by increasing the number of pixels defined by the no-electrode areas or the number of domains. Thus, it is possible to stably reproduce the axially symmetric orientation even when displaying a motion picture without exposing the precursor mixture containing a liquid crystal material and a photocurable material with the axially symmetric orientation central axis setting voltage being applied therethrough. Therefore, the precursor mixture and the exposure process for setting an axially symmetric orientation of the liquid crystal molecules based on the orientation memory property thereof are no longer necessary. Thus, steps (a) and (f) in the above-described production method of the present invention to be described later can be omitted, thereby providing advantages in view of the production process and the production cost. It is preferred that the relationship $20 \leq ds \leq 50$ and $0.5 \leq y \leq -0.025ds+2$ is satisfied, wherein D denotes the interval between two adjacent no-electrode areas, ds denotes the length of each side (when the no-electrode area has a rectangular shape) or the diameter (when the no-electrode area has a circular shape) of the no-electrode area, and y denotes a ratio D/ds. It is more preferred that the size of each pixel is less than or equal to 70 $\mu$m×70 $\mu$m.

(Phase Difference Compensator)

The liquid crystal display device of the present invention operates in a multi-domain mode or an axially symmetric orientation mode where a black display is produced in the absence of an applied voltage and a white display is produced in the presence of an applied voltage. Therefore, it is possible to compensate the viewing angle in every azimuth direction by providing a phase difference compensator between the liquid crystal cell and at least one of the pair of polarizing plates. Such a phase difference compensator has three different refractive indices $n_x$, $n_y$ and $n_z$, along the x, y and z axis directions, respectively, which are orthogonal to one another. The refractive indices $n_x$ and $n_y$ are the primary refractive indices along the plane of the liquid crystal cell, and refractive index $n_z$ is the primary refractive index along the thickness direction of the liquid crystal cell. The maximum refractive index $n_x$ axis is perpendicular to the absorption axis of one of the polarizing plates which is provided on the side of the cell closer to the viewer, and the relationship $n_z < n_y < n_x$ holds between the refractive indices $n_z$, $n_y$ and $n_x$.

The phase difference compensator may be in the form of a film, a plate or a laminate thereof. The phase difference compensator can be produced by using a film drawing method or by applying a liquid crystal polymer on a support substrate so as to obtain an intended retardation. A biaxial phase difference compensator which has a phase difference between a direction parallel to the phase difference compensator plane and a direction normal to the phase difference compensator plane is particularly preferred. It is possible to improve the viewing angle characteristics from a direction 45° with respect to the absorption axis of the polarizing plate and thus to obtain good viewing angle characteristics in every azimuth direction when the following conditions are satisfied: the in-plane retardation is 20 nm to 90 nm; the normal-direction retardation is 130 nm to 210 nm; the slow axis of one phase difference compensator is perpendicular to the absorption axis of the adjacent polarizing plate; and the slow axis of the phase difference compensator is perpendicular to the slow axis of the other phase difference compensator.

(Function)

The function of the present invention will now be described.

The liquid crystal display device of the present invention includes a pair of electrode substrates and a liquid crystal layer interposed therebetween. The liquid crystal display device provides advantageous effects by controlling the orientation of the liquid crystal molecules in axial symmetry in the presence of an applied voltage in each of a plurality of pixels of the electrodes on at least one of the substrates.

According to the first aspect of the present invention, the orientation of the liquid crystal molecules is controlled in axial symmetry in the presence of an applied voltage in each of the plurality of display pixel regions, thereby significantly improving the viewing angle dependency of the liquid crystal display device.

According to one embodiment of the present invention where the liquid crystal molecules retain the vertical alignment in the presence of an applied voltage, it is possible to control the liquid crystal molecules in a multi-domain orientation or an axially symmetric orientation.

The no-electrode areas surrounding the pixels are the factors that control the multi-domain or axially symmetric orientation.

In an embodiment where the relationships represented by Expressions 1 and 2 are satisfied, it is possible to obtain a multi-domain orientation or an axially symmetric orientation in each pixel defined by square or circular no-electrode areas. Moreover, it is possible to obtain an axially symmetric orientation in a no-electrode area where it is difficult to apply an electric field.

In an embodiment where the relationships represented by Expressions 3 and 4 are satisfied, it is possible to obtain a multi-domain orientation or an axially symmetric orientation in each pixel defined by being surrounded by rectangular no-electrode areas.

In an embodiment where a nematic liquid crystal material is used to realize a multi-domain orientation and the liquid crystal molecules are aligned substantially vertical to the substrate in a black display, it is possible to realize a high contrast and a wide viewing angle.

In an embodiment where a liquid crystal material having a negative dielectric anisotropy is used and the display device is operated in a multi-domain normally black mode, it is possible to realize an even higher contrast and an even wider viewing angle.

In an embodiment where a phase difference compensator is provided between the liquid crystal cell and at least one of the pair of polarizing plates, it is possible to improve the viewing angle characteristics from a direction 45° with respect to the absorption axis of the polarizing plate, and thus to obtain isotropic viewing angle characteristics in every azimuth direction.

The cell thickness keeping member existing in each pixel which transmits light therethrough may cause light leakage in a black display, reduce the contrast and lower the stability of the orientation of the liquid crystal molecules, thereby causing non-uniformity where the display is viewed from an inclined angle. However, in an embodiment of the present invention where the cell thickness keeping member is provided outside the pixel or in the no-electrode area, it is possible to avoid the problems associated with the cell thickness keeping member. In an embodiment where the cell thickness keeping member is dispersed, it is possible to reduce the amount of time required for the liquid crystal material injection process as compared to a case where the conventional "wall-pillar structure" is employed which may increase the liquid crystal injection time.

The liquid crystal display device of the present invention can be used with any driver which uses electrodes, and thus can be used with any display device for which wide viewing angle characteristics are desirable. Particularly, when PALC (plasma-addressed liquid crystal display device) is used as a driver, the optimal value of the retardation (cell thickness $d \times \Delta n$) of the liquid crystal layer is slightly increased, whereby the cell thickness can be increased as compared to a case where the no-electrode area is not included in a display pixel. The voltage between the plasma discharge channels and the counter electrode lines is shared by a thin glass plate 76 (FIG. 7) and a liquid crystal layer 74 according to the capacitance ratio therebetween. Therefore, as the cell thickness increases, the voltage applied through the liquid crystal layer increases, whereby the liquid crystal display device can be driven with a smaller voltage.

With a method for producing a liquid crystal display device according to a preferred embodiment of the present invention, it is possible to obtain an axially symmetric orientation of a multi-domain orientation only by etching electrodes into an intended pattern. In another embodiment of the present invention, an orientation setting layer is formed by curing a UV curable resin material in a precursor mixture by irradiating the precursor mixture with UV light in the presence of an axially symmetric orientation central axis setting voltage in order to set the initial orientation based on the orientation memory property of the liquid crystal molecules so as to stabilize the orientation of the liquid crystal molecules in operation. In such a case, it is no longer necessary to provide protrusions such as a wall or pillar structure as those used in the prior art, whereby it is possible to reduce the material cost and to improve the production efficiency in terms of the production yield and throughput (reduction in the production time) due to the reduction in the number of production steps to be performed.

EXAMPLES

Examples of the present invention will now be described, but the present invention is not limited to the examples below.

Example 1

A liquid crystal display device including an electrode substrate having square no-electrode areas therein was produced. The square no-electrode areas were arranged in a pattern with the interval (D) between two adjacent no-electrode areas being 30 μm, the length (ds) of each side of the square no-electrode area being 30 μm (and thus the ratio y=D/ds is 1), and the size of each pixel defined by being surrounded by the no-electrode areas being 120 μm. The method for producing a liquid crystal cell was basically the same as that described above, except for the use of TFT as a driver. The cell thickness was controlled by dispersing plastic beads (not shown) as a cell thickness keeping member across the surface of a substrate on which the electrode lines and the no-electrode areas had already been provided. The beads were dispersed across the substrate in the presence of an applied electric field. In this way, it was possible to selectively place the beads in the no-electrode areas between the electrode lines.

The axially symmetric orientation percentage in a pixel which is defined by the no-electrode areas was substantially 100%. Moreover, when the precursor mixture as described above was injected as a liquid crystal material, an orientation setting (polymer stabilizing) layer was provided by irradiating the precursor mixture with UV light in the presence of an axially symmetric orientation central axis setting voltage, whereby it was possible to realize a stable orientation when driving the liquid crystal molecules. With no TFT substrate, the liquid crystal voltage retention was measured to be 99%. This value did not substantially decrease, and remained at 98% or higher, even after a 10,000-hour conduction aging test. Various other evaluation tests were conduced such as an image burn test, in which any image burn on the display was evaluated after displaying a stationary fixed pattern for a long time. As a result, no burnt image remaining phenomenon was observed.

A biaxially-drawn film phase difference compensator made of a norbornene resin (in-plane retardation: 50 nm, normal-direction retardation: 190 nm) was provided between the produced liquid crystal cell and each of a pair of polarizing plates on opposite sides of the liquid crystal cell. As a result, good viewing angle characteristics were obtained over an angle range of 160° in every azimuth direction with a contrast ratio of 10.

Example 2

In Example 2, a liquid crystal cell was produced in a manner similar to that of Example 1, and rectangular no-electrode areas were provided in a broken-line pattern as illustrated in FIG. 4. The no-electrode areas were formed by partially removing the deposited electrode by photolithography and etching, with the length (ps) of each side of the no-electrode area being 80 $\mu$m, the width thereof being 20 $\mu$m, the distance (P) equal to ½ of the interval between two adjacent no-electrode areas being 30 $\mu$m and the value of Y (P/ps) being 0.375.

The size of each pixel defined by the no-electrode areas was 160 $\mu$m×160 $\mu$m. The axially symmetric orientation percentage in the pixels defined by the no-electrode areas was substantially 100%. Moreover, when the precursor mixture as described above was injected as the liquid crystal material, an orientation setting (polymer stabilizing) layer was provided by irradiating the precursor mixture with UV,light in the presence of an axially symmetric orientation central axis setting voltage, whereby it was possible to realize a stable orientation when driving the liquid crystal molecules.

With no TFT substrate, the liquid crystal voltage retention was measured to be 99%. This value did not substantially decrease, and remained at 98% or higher, even after a 10,000-hour conduction aging test. Various other evaluation tests were conduced such as an image burn test, in which any image burn on the display was evaluated after displaying a stationary fixed pattern for a long time. As a result, no burnt image remaining phenomenon was observed.

A pattern of no-electrode areas which eliminated the need for the orientation setting layer material and the orientation setting layer formation step was obtained when each no-electrode area was formed with a size of 50 $\mu$m (=ps)×10 $\mu$m (width), and each pixel defined by the no-electrode areas had a size of 70 $\mu$m×70 $\mu$m. Then, it was possible to obtain a liquid crystal display device without performing the steps (a) and (f) described above. This is very advantageous in terms of the production process.

Example 3

Example 3 is an example where the present invention is applied to a plasma-addressed liquid crystal display device.

Figure 7:
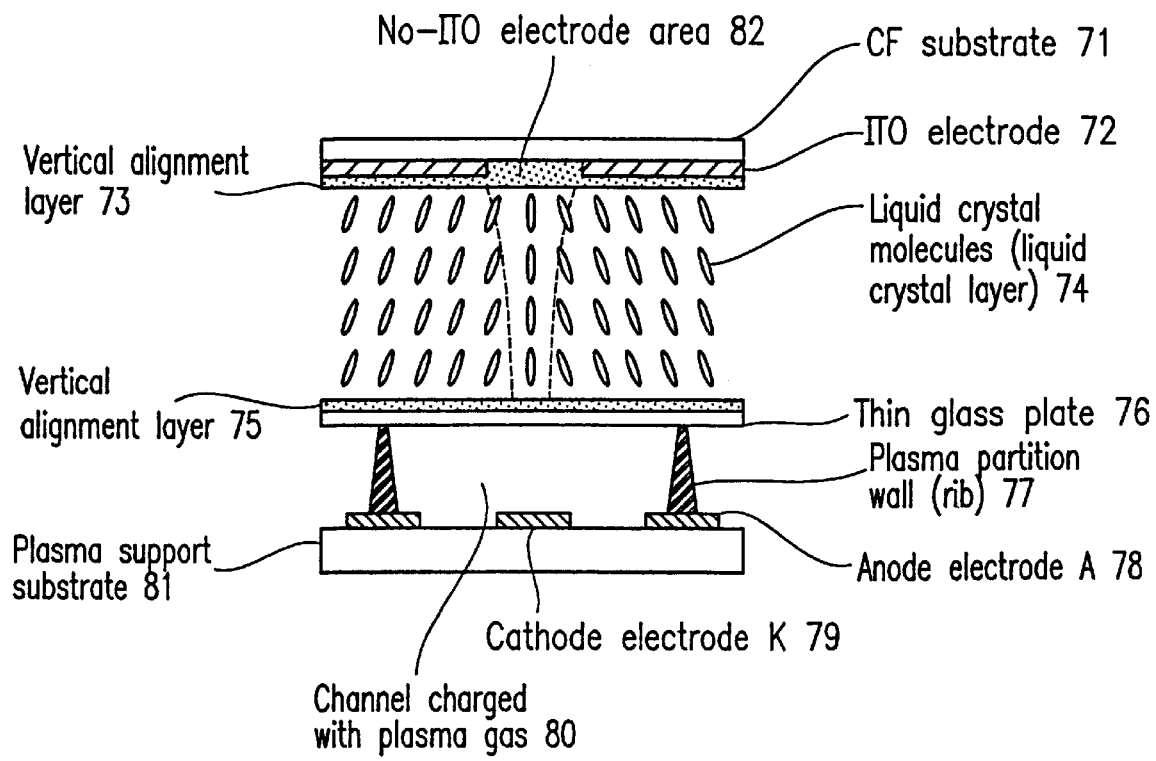
FIG. 7 is a cross-sectional view illustrating a structure of a plasma-addressed liquid crystal display device according to Example 3 of the present invention.

FIG. 7 is a cross-sectional view illustrating a structure of a plasma-addressed liquid crystal display device according to Example 3. The liquid crystal display device includes a transparent substrate 71 made of a glass, or the like, on one side (upper side in FIG. 7) of the liquid crystal layer 74. Provided on the other side (lower side in FIG. 7) of the liquid crystal layer 74 is a plasma generation substrate including a thin glass plate 76 as a dielectric sheet and a plasma support substrate 81 opposing each other. A partition wall 77 is provided to extend in a line pattern between the plasma support substrate 81 and the thin glass plate 76. A space surrounded by the partition wall 77, the plasma support substrate 81 and the thin glass plate 76 is used as a channel 80 which extends in a line pattern and is charged with a plasma gas. An anode electrode A 78 and a cathode electrode K 79 are provided in each channel 80 for turning the plasma gas into a plasma. The plasma-addressed device substrate can be produced by any conventional method known in the art.

A color filter (CF) is provided on the liquid crystal layer side of the substrate 71, and transparent electrodes 72 as data lines are provided in a stripe pattern on the CF substrate 71 so that transparent electrodes 72 extend in a direction which is not parallel, e.g., in a direction perpendicular, to the direction of the plasma channels extending in a line pattern.

The liquid crystal layer 74 is interposed between the upper substrate and the thin glass plate 76, and includes a plurality of pixels defined therein. Vertical alignment layers 73 and 75 are provided on one side of the CF substrate 71 and the thin glass plate 76 facing the liquid crystal layer 74.

The CF substrate 71, the ITO electrode 72 and the liquid crystal layer 74 together form a liquid crystal cell. A pair of polarizing plates are provided on opposite sides of the liquid crystal cell, and a phase difference compensator is provided between the liquid crystal cell and at least one of the polarizing plates. Moreover, a backlight is provided on the plasma substrate side of the display device.

In the liquid crystal display device produced as described above, a vertical alignment layer is provided on one surface of each of the thin glass plate 76 and the CF substrate 71 facing the liquid crystal layer 74. Therefore, when using liquid crystal material having a negative dielectric anisotropy, the liquid crystal molecules are oriented substantially vertically to the substrate in the presence of an applied voltage so as to provide an axially symmetric orientation in each pixel defined by the transparent no-electrode areas on the CF substrate 71. Optionally, it is possible to mix a photocurable material in the liquid crystal material and irradiate the mixture with UV light so as to set the orientation of the liquid crystal molecules based on the orientation memory property thereof. In such a case, an axially symmetric orientation can be stably realized when displaying a motion picture, whereby it is possible to realize a high-contrast wide-viewing angle display, in which the contrast ratio is 10 over an angle range of 140° in every azimuth direction.

In order to suppress the reduction in the voltage retention of the liquid crystal layer due to the UV radiation from the plasma substrate, it is optionally possible to use a material for blocking UV light (250 nm to 350 nm) by mixing it in the thin glass plate or by coating it across the surface of the thin glass plate.

When the cell thickness is increased so that the retardation d×Δn of the liquid crystal layer has an optimal value (550 nm), the voltage-transmission characteristics are improved. In such a case, as the voltage between the plasma discharge channels and the counter electrode lines is shared by the thin glass plate 76 (FIG. 7) and the liquid crystal layer 74 according to the capacitance ratio therebetween, the voltage application can be effected more efficiently, thereby realizing a reduced operating voltage.

Example 4

In Example 4, a liquid crystal cell was produced in a manner similar to that of Example 2. Rectangular no-ITO electrode areas were provided in a broken-line pattern (FIG. 4), with the length of each longer side of the no-electrode area being 40 μm and the length of each shorter side of the no-electrode area being 10 μm. The no-electrode areas were formed by partially removing the deposited electrode by photolithography and etching, with the distance (P) equal to ½ of the interval between two adjacent no-electrode areas being 20 μm. The size of each pixel defined by the no-electrode areas was 50 μm×50 μm. The axially symmetric orientation percentage in a pixel which is defined by the no-electrode areas was substantially 100%.

The liquid crystal material contained no photocurable resin, and when the liquid crystal molecules were driven by a driver, the orientation of the liquid crystal molecules was controlled to be a multi-domain axially symmetric orientation. Thus, this example of the present invention is very advantageous in terms of the production cost and the long-term reliability of the device because no photocurable resin material is necessary.

Comparative Example 1

In Comparative Example 1, a liquid crystal cell was produced in a manner similar to that of Example 1 except that no no-electrode areas were provided in the pixel electrodes. The same liquid crystal material as that used in Example 1 was injected into the liquid crystal cell. A pair of polarizing plates were arranged on opposite sides of the liquid crystal cell so as to be in a crossed Nicols state.

In the presence of an applied voltage, a pixel of the produced liquid crystal cell was observed by a polarization microscope (in a crossed Nicols state). A random orientation was observed in the pixel. An observation of the entire liquid crystal panel with human eyes showed that the panel had a non-uniform display.

According to the present invention, an applied electric field is distorted or curved by providing no-electrode areas in an intended regular pattern. By the distortion or curving of the electric field, the orientation of the liquid crystal molecules in the presence of an applied voltage is defined.

According to the present invention, Nn liquid crystal molecules having a negative dielectric anisotropy in the liquid crystal material are vertically oriented. In the liquid crystal display device, areas where the liquid crystal molecules are vertically oriented on the electrode substrate, or no-electrode areas on the electrode substrate, are provided at predetermined positions or at predetermined intervals to form and surround pixels. Thus, in the presence of an applied voltage, the liquid crystal molecules are oriented in a stable axially symmetric or multi-domain orientation for each pixel defined by the no-electrode areas.

Moreover, a liquid crystal display device having desirable viewing angle characteristics and a high contrast can be provided by providing a phase difference compensator between the liquid crystal cell and at least one of a pair of polarizing plates.

According to the production method of the present invention, an axially symmetric orientation is provided by performing only the step of providing areas where the liquid crystal molecules are vertically oriented on the electrode substrate, or no-electrode areas, at predetermined positions or at predetermined intervals to form and surround pixels.

The liquid crystal display device of the present invention is suitable for use in a flat display such as those in personal computer, a word processor, an amusement apparatus, a television set, or the like, and in a display board, a window, a door, a wall, or the like, utilizing a shutter effect.

In the conventional techniques where an orientation controlling member in the form of a slope portion was used, it was necessary to set the height of a protrusion to be equal to or greater than ⅙ of the cell thickness or 1 (μm), while setting the inclination angle of the protrusion to be 10° or more. On the contrary, the present invention no longer requires such an orientation controlling member in the form of a slope portion, whereby the gap between an electrode area and a no-electrode area can be about 300 nm. Moreover, since no convex/concave portions are formed on the substrate, the liquid crystal injection time is reduced, and the "chromatographic phenomenon" due to the adsorption/desorption of the liquid crystal molecules onto/from the surface of the substrate is less likely to occur, thereby realizing uniform display characteristics over a large area.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising a pair of electrode substrates with a liquid crystal layer being interposed therebetween, wherein:
   no-electrode areas, where no electrode exists, are provided in a discrete pattern partially on at least one of the pair of electrode substrates;
   a pixel, which is a minimum unit of display, is defined by being surrounded by a plurality of the no-electrode areas; and
   wherein the no-electrode areas substantially cause the liquid crystal molecules to be oriented in an axially symmetric or multi-domain orientation in each pixel when a voltage is applied between the pair of electrode substrates.

2. A device according to claim 1, wherein each pixel includes an area in which the liquid crystal molecules are maintained in a vertical alignment in the presence of an applied voltage.

3. A device according to claim 2, wherein a threshold voltage in voltage-transmission characteristics for the area in which the liquid crystal molecules are maintained in a vertical alignment in the presence of an applied voltage is equal to or greater than 1.5 times that for other areas, in which the liquid crystal molecules do not retain the vertical alignment in the presence of an applied voltage, and a saturation voltage in voltage-transmission characteristics for the area in which the liquid crystal molecules are maintained in a vertical alignment in the presence of an applied voltage is equal to or greater than 1.5 times that for the other areas, in which the liquid crystal molecules do not retain the vertical alignment in the presence of an applied voltage.

4. A device according to claim 1, wherein:
the no-electrode areas are provided in a discrete and regular manner in each pixel;
the pixel has a square shape or a rectangular shape; and
an axis of the axially symmetric orientation exists in the pixel.

5. A device according to claim 1, wherein:
the no-electrode area has a square shape or a circular shape;
Expressions 1 and 2 below are satisfied, wherein D ($\mu$m) denotes a distance between two adjacent no-electrode areas, ds ($\mu$m) denotes a length of each side or a diameter of the no-electrode area, and y=D/ds;
Expression 1: $20 \leq ds \leq 50$
Expression 2: $0.1 \leq y \leq -0.025ds + 2.25$
each pixel defined by the no-electrode areas has a square shape or rectangular shape;
if the pixel has a square shape, a size of the pixel is 20 $\mu$m×20 $\mu$m to 200 $\mu$m×200 $\mu$m; and
if the pixel has a rectangular shape, a length of each longer side of the pixel is 20 $\mu$m to 200 $\mu$m and an aspect ratio of the pixel (the ratio between the length and the width: "r") is $1 < r < 2$.

6. A device according to claim 1, wherein:
each no-electrode area has a rectangular shape;
Expressions 3 and 4 are satisfied, wherein P ($\mu$m) denotes ½ of a distance between two adjacent no-electrode areas, ps ($\mu$m) denotes a length of the longer side of the no-electrode area, and Y=P/ps;
Expression 3: $60 \leq ps \leq 120$
Expression 4: $-10^{-6}ps^3 + 0.0004ps^2 - 0.0578ps + 2.325 \leq y \leq -10^{-6}ps^3 + 0.0004ps^2 - 0.0578ps + 3.325$
each pixel defined by the no-electrode areas has a square shape or a rectangular shape;
if the pixel has a square shape, a size of the pixel is 20 $\mu$m×20 $\mu$m to 200 $\mu$m×200 $\mu$m; and
if the pixel has a rectangular shape, a length of each longer side of the pixel is 20 $\mu$m to 200 $\mu$m and an aspect ratio of the pixel (the ratio between the length and the width: "r") is $1 < r < 2$.

7. A device according to claim 1, wherein:
the liquid crystal layer comprises a nematic liquid crystal material; and
the liquid crystal molecules in the nematic liquid crystal material are oriented substantially vertical to a surface of each of the pair of electrode substrates in a black display and are oriented in an axially symmetric orientation in a white display.

8. A device according to claim 1, wherein:
the liquid crystal layer comprises a vertical alignment layer and a nematic liquid crystal material having a negative dielectric anisotropy; and
the liquid crystal molecules of the nematic liquid crystal material are oriented substantially vertical to a surface of each of the pair of electrode substrates in the absence of an applied voltage.

9. A device according to claim 1, further comprising:
a liquid crystal cell comprising the pair of electrode substrates and the liquid crystal layer interposed between the pair of electrode substrates;
a pair of polarizing plates interposing the liquid crystal cell therebetween; and
a phase difference compensator provided between the liquid crystal cell and at least one of the pair of polarizing plates, wherein:
each of the polarizing plates and the phase difference compensator has three refractive indices $n_x$, $n_y$ and $n_z$ along x, y and z axis directions, respectively, which are orthogonal to one another;
the refractive indices $n_x$ and $n_y$ are primary refractive indices along a plane of the liquid crystal cell, and refractive index $n_z$ is a primary refractive index along a thickness direction of the liquid crystal cell;
the maximum refractive index $n_x$ axis is perpendicular to an absorption axis of one of the polarizing plate which is provided on one side of the cell closer to the viewer; and
the relationship $n_z < n_y < n_x$ holds between the refractive indices $n_z$, $n_y$ and $n_x$.

10. A device according to claim 1, wherein a cell thickness keeping member for keeping a thickness of the liquid crystal layer is provided outside the pixel or in the no-electrode area.

11. A device according to claim 1, wherein the device is applied to a plasma-addressed liquid crystal display device (PALC), a thin film transistor (TFT), or a diode.

12. A method for producing a liquid crystal display device comprising a pair of electrode substrates with a liquid crystal layer being interposed therebetween, said method comprising:
providing no-electrode areas, where no electrode exists, in a discrete pattern partially on at least one of the pair of electrode substrates;
such that a pixel, which is a minimum unit of display, is defined by being surrounded by a plurality of the no-electrode areas; and
providing a liquid crystal material into a gap between the pair of electrode substrates,
such that the no-electrode areas substantially cause the liquid crystal molecules to be oriented in an axially symmetric or multi-domain orientation in each pixel when a voltage is applied between the pair of electrode substrates.

13. A method according to claim 12, the step (e) comprising the step of:
(e') attaching the pair of substrates to each other and injecting the prepared precursor mixture into a gap between the pair of substrates, and the method further comprising the steps of:
(a) heating a mixture of a liquid crystal material and a photocurable material to a temperature equal to or greater than a compatibility critical temperature of the mixture, and then cooling the mixture to prepare a precursor mixture;

(b) forming electrode lines by pattern etching on one of a pair of substrates;
(c) applying a vertical alignment film on each of the pair of substrates;
(d) printing a seal material on one of the pair of substrates around a display area;
(f) applying an external electric field to tilt liquid crystal molecules by a tilt angle, and polymerizing and curing the photocurable material with the liquid crystal molecules being tilted by the tilt angle, thereby setting an axially symmetric orientation of the liquid crystal molecules based on an orientation memory property of the liquid crystal molecules; and
(g) sealing the liquid crystal layer with a sealant.

14. A method according to claim 12, further comprising the steps of:

(b) forming electrode lines by pattern etching on one of a pair of substrates;
(c) applying a vertical alignment film on each of the pair of substrates;
(d) printing a seal material on one of the pair of substrates around a display area; and
(g) sealing the liquid crystal layer with a sealant.

* * * * *